(12) United States Patent
King et al.

(10) Patent No.: US 12,088,644 B1
(45) Date of Patent: Sep. 10, 2024

(54) SINGLE NUMBER COMMUNICATIONS ACCESSIBILITY

(71) Applicant: T-Mobile USA, Inc., Bellevue, WA (US)

(72) Inventors: Willie Dorance King, Austin, TX (US); Mayank Bhutani, Duvall, WA (US); Poornima Magadevan, Bellevue, WA (US); Homer Nicolas B. Filart, Renton, WA (US); Jason Wayne Hayes, Lynnwood, WA (US); Dinko Dinkov, Kirkland, WA (US); Suryanarayana Murthy Gorty, Redmond, WA (US); Mark Alan Tauscher, Phoenix, AZ (US); Dennis Allan Selznick, Overland Park, KS (US); Stephen Lee Dekat, Olathe, KS (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 18/200,369

(22) Filed: May 22, 2023

(51) Int. Cl.
*H04L 12/00* (2006.01)
*H04L 65/1046* (2022.01)
*H04L 65/1069* (2022.01)
*H04L 65/1104* (2022.01)

(52) U.S. Cl.
CPC ...... *H04L 65/1104* (2022.05); *H04L 65/1046* (2013.01); *H04L 65/1069* (2013.01)

(58) Field of Classification Search
CPC ............. H04L 65/1104; H04L 65/1046; H04L 65/1069; H04L 67/141; H04L 65/1045; H04L 65/1086; H04L 67/146; H04L 65/104
USPC .................................................. 709/224, 203
See application file for complete search history.

(56) References Cited

U.S. PATENT DOCUMENTS

| | | | |
|---|---|---|---|
| 11,070,595 B1* | 7/2021 | Asveren | H04L 65/104 |
| 11,895,195 B2* | 2/2024 | Pierrepont | H04L 67/141 |
| 2021/0306383 A1* | 9/2021 | Muravlyannikov | H04L 65/1069 |
| 2022/0070226 A1* | 3/2022 | Grover | H04L 67/146 |
| 2022/0232053 A1* | 7/2022 | Grover | H04L 65/1086 |
| 2022/0329634 A1* | 10/2022 | Al-Damluji | H04L 65/1045 |
| 2023/0300201 A1* | 9/2023 | Pierrepont | H04L 67/141 709/203 |

* cited by examiner

*Primary Examiner* — Frantz Coby
(74) *Attorney, Agent, or Firm* — Lee & Hayes, P.C.

(57) ABSTRACT

System and methods for routing requests for both assisted communications and non-assisted communications with devices operated by deaf or hard-of-hearing (DHH) users using a single number are described. A network component may determine whether to use routing that directs such requests to an assistance system based on the type of communications requested and one or more identifiers in a request. If a communications request includes a DHH user device's identifier and communications type that are represented in assistance routing data, the network component may forward that request to an assistance system. Otherwise, the network component may route such a request normally. A DHH user may request a suspension of the assistance routing for a period of time and/or until reinstatement of the assistance routing is requested.

20 Claims, 11 Drawing Sheets

SINGLE NUMBER COMMUNICATIONS ACCESSIBILITY

BACKGROUND

Systems to assist those with hearing disabilities (e.g., deaf or hard-of-hearing users, referred to herein as "DHH" users) with using telephones have been in use for many years. These systems have evolved as technology has progressed, improving the availability and usability of such systems. Many such assistance systems involve the use of third parties to facilitate communications between a hearing user and a DHH user. Such third parties may provide translation between spoken language and sign language to facilitate a conversation between such users, using video technology to present interpreted sign language to a DHH user. This type of service may be referred to as Video Relay Service (VRS).

The capabilities of modern communications devices and networks have expanded greatly over recent years, providing alternative communication channels to many users other than voice, such as text messaging, email instant messaging, etc. In fact, many users today use text communications much more frequently than voice calls. However, voice calls remain of great value to the majority of users. For most users, a single telephone number can be used for voice and text communications. However, for DHH users, a different number is for voice communications than for other types of communications because a third party or system (e.g. VRS, interpreter) is required to participate in a voice call with a hearing user. Therefore, a hearing caller must use one number that contacts the third party in order to place a voice call to a DHH user, while using a second, different number for other forms of communication that may use standard telecommunications processing to communicate with a DHH user's device.

This presents a significant issue for a DHH user because the DHH user must provide two numbers to each contact with whom the DHH user may wish to communicate using a communications device. A DHH user's contacts may confuse the numbers or make note of only one since most current collections of personal information (e.g., contact information forms) collect a single number, assuming that both voice and text communications may be received at that number. This may result in contacts attempting to text the DHH user's VRS number and/or place voice calls to a number at which the DHH user may only receive text communications.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
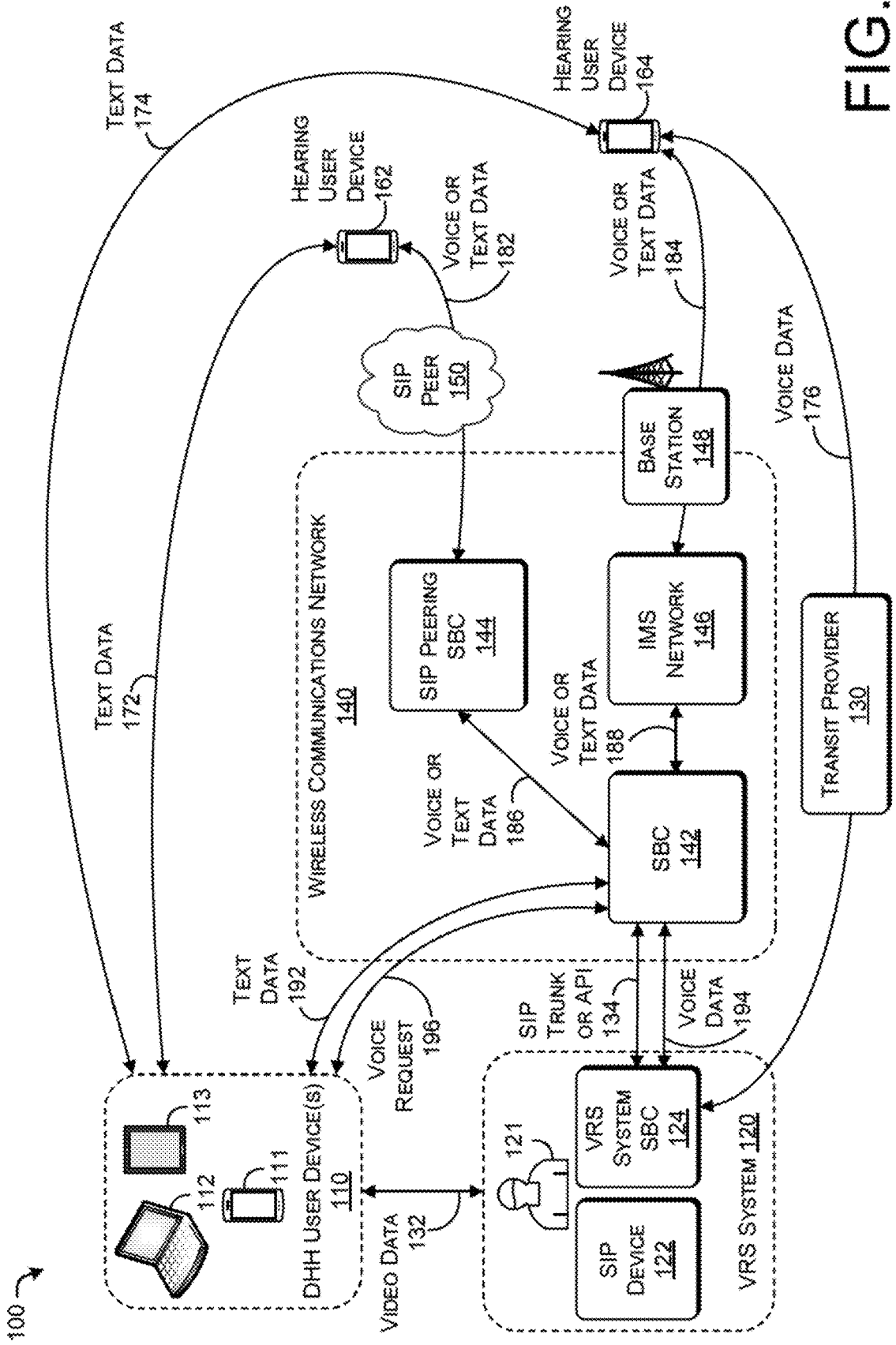
FIG. 1 is a schematic diagram of an illustrative wireless communication network environment in which systems and techniques for single number communications accessibility may be implemented, in accordance with examples of the disclosure.

This disclosure is directed in part to systems and techniques for implementing single number communications accessibility for communications of various types that may be initiated and/or received by a user equipment (UE) (e.g., smartphone, cell phone, mobile device, wireless communication device, mobile station, etc.) in advanced wireless communications networks. Such advanced networks include, but are not limited to, networks that support one or more 3GPP standards, including, but not limited to, Long Term Evolution (LTE) networks (e.g., 4G LTE networks) and New Radio (NR) networks (e.g., 5G NR networks); one or more IETF standards); one or more IEEE standards (e.g., any one or more of the IEEE 802.11 standards); and/or any other industry standards and/or specifications. However, the disclosed systems and techniques may be applicable in any network or system in which a user device may initiate, receive, or otherwise establish communications with another device or system using any protocol.

A DHH user may have access to a voice communications assistance service or system, such as a video relay service (VRS) or a video interpreting service (VIS) (generally referred to herein as "VRS"), that allows voice calls with the DHH user and a hearing user to be facilitated by an interpreter (e.g., human interpreter) who interprets spoken language audio content from a hearing user into sign language that is then presented to the DHH user as video content. An interpreter (e.g., the same interpreter or a separate interpreter) may be presented with video content including the DHH user's sign language and interpret the sign language into spoken language that may be provided to the hearing user as audio content. In some examples, the hearing user may also be presented with video content including the interpreter and/or the DHH user. An "interpreter" as used herein may also, or instead, be an artificial intelligence (AI) system and/or machine-learned model-executing system that may recognize and/or generate sign language and/or otherwise interpret sign language into audio and/or text content and/or vice versa. In examples, a voice communications assistance service or system may also, or instead, include IP and/or an internet relay services (e.g., telecommunication relay services), hearing carry over services, voice carry over services, and speech to speech services. As used herein, "VRS," "assistance service," and "assistance system" may refer to any such services, any other systems and/or services performing any of the assistance operations and functions described herein, and any combination thereof.

Due to the involvement of an assistance system and one or more interpreters, in conventional systems, a DHH user may be assigned a separate number for voice calls that are routed to the assistance system, which then establishes the audio and video communications needed to facilitate spoken language and sign language interpretation between the DHH user and a hearing user. This assistance number may serve as the destination number when used to place a call to the DHH user and/or as a source number when used by the DHH user to place a voice call (e.g. using an app on the DHH user's mobile device). The DHH user may use the same mobile device for receiving and placing voice calls as well as engaging in other forms of communication, such as text messages, instant messaging, etc. Because the non-voice types of communications may not require additional or non-standard processing, systems, or services, the DHH user may use the mobile device's number (e.g., a number provided by a wireless provider and/or associated with the device, the SIM, etc.) for such types of communications. As will be appreciated, this use of two separate and distinct numbers to engage in multiple forms of communication on a single device can be inconvenient for a user and results in inefficient use of device and network resources.

To address the inefficiencies and inconvenience of using multiple numbers for different communication types on a single device, one or more wireless network components may be configured to process communications requests using single number communications data to automatically route such requests to an assistance system or for standard non-voice communications routing according to the systems and techniques described herein.

In various examples, a wireless communications network may generate and maintain one or more data structures that may be accessed to determine whether to route a communications request to an assistance system for assisted call establishment or to route the communications request using normal routing procedures. A component on the wireless communications network may serve as a single number communications controller. A single number communications controller and/or any of the functions associated therewith may be implemented as a dedicated (e.g., stand-alone) network component or at one or more network components that also perform other operations. In examples, the functions of a single number communications controller may be distributed across multiple components. Such components may be physical and/or logical components.

In examples, a single number communications controller may be implemented at a session border controller (SBC). In particular examples, an SBC may be configured to implement, or otherwise perform operations associated with, a call session control function (CSCF), such as a serving CSCF (S-CSCF) and/or an interrogating CSCF (I-CSCF). These functions may perform one or more of the single number communications controller operations described herein. In other examples, another component of a device within a wireless communications network may perform such functions. As used herein, a "single number communications controller" refers to any one or more components, systems, devices, and/or any combination thereof configured to perform the operations associated with a single number communications controller as described herein.

In various examples, single number communications data used to determine appropriate routing for a communications request may be stored in one or more data structures accessible by and/or stored at a single number communications controller. In particular examples, single number communications data may be stored as initial filter criteria (iFC). Such iFC may be stored at a home subscriber server (HSS) and may be loaded onto (e.g., during IMS registration (e.g., by a CSCF)), stored at, or otherwise accessible to a CSCF. In other examples, single number communications data used to determine whether to route communications requests to an assistance system may be stored at any one or more components, systems, devices, and/or any combination thereof configured to provide the single number communications data processed by a single number communications controller as described herein.

In examples, a DHH user may request a single number communications routing configuration for the DHH user's telephone number and/or other device or user identifier, such as a mobile station international subscriber directory number (MSISDN), an international mobile subscriber identity (IMSI), a telephone number, a network address (e.g., IP address), a uniform resource identifier (URI), or any combination thereof. The DHH user may provide such a request to a network operator using a graphical user interface presented to the user by an operator system. This interface may allow the user to select or indicate a particular assistance system (e.g. VRS system) to which voice communications requests indicating the user's mobile device are to be routed.

A communications request as described herein may be any request for the establishment of a communications session of any type or a request for any other form of communications. For example, a communications request may be a session initiation protocol (SIP) message, such as a SIP INVITE message, requesting the establishment of a voice call between a source device and a destination device. Such a SIP INVITE may specify source and destination device identifiers (e.g., telephone numbers, IMSIs, MSIDSNs, addresses, etc.) and a type of communication requested (e.g. voice, video, messaging, etc.). A communications request may also, or instead, be a request from a source device to transmit a message to a destination device, such as a text message or instant message. Such a communications request may also specify source and destination device identifiers but may not be associated with establishing a synchronous communications session (e.g. voice call), instead requesting the asynchronous transmission of data (e.g., a text message) to the destination device.

In examples, a single number communications controller may receive a communications request from a source device, for example, via one or more components within a wireless communications network (e.g. from a base station configured in the wireless communications network and in communication with the source device, from a peer network, etc.). The single number controller may process the communications request to determine whether to route the request based on normal (e.g., standard) routing procedures or to route the request to an assistance system. For example, the single number communications controller may determine whether the communications request is a request to establish a non-voice communications session or otherwise transmit non-voice communications data (e.g. a text message). If so, the single number communications controller may route the communications request as normal (e.g., route as a standard text message, etc.).

The single number communications controller may determine a voice/non-voice property of the request based on explicit and/or implicit data associated with the request. For example, the single number communications controller may implicitly determine that a SIP INVITE message is a request to establish a voice communications session because is it a SIP message. Alternatively or additionally, the single number communications controller may explicitly determine a voice/non-voice property of the request based on an explicit indication within or associated with the request, such as the value of a field represented in the request that may indicate a communications type.

If the single number communications controller determines that the communications request is a request to establish a voice communications session, the single number communications controller may evaluate the request against single number communications data to determine whether to process the request as a standard voice call or an assisted call. For example, the single number communications controller may determine whether the destination identifier (e.g., telephone number, MSISDN, IMSI, address, etc.) indicated in the request is represented in the single number communications data as being associated with an assistance system or assisted calling.

If the single number communications controller determines that the destination identifier is associated with an assistance system or assisted calling, it may determine a particular assistance system (e.g. VRS system) associated with the destination identifier (e.g., as represented in single number communications data). Alternatively or additionally, the single number communications controller may be configured to use a default assistance system (e.g., for all assistance system-associated destination identifiers and/or for those assistance system-associated destination identifiers that are not associated with a particular assistance system). The single number communications controller may then route the request to the determined assistance system or generate another communications request to be transmitted to the determined assistance system based on the received communications request. If the single number communications controller determines that the destination identifier is not associated with an assistance system or assisted calling, it may route or otherwise process the request as a normal voice call request.

In various examples, a DHH user may suspend the use of assisted calling using one or more assistance suspension codes or other indications detectable by a single number communications controller. For example, the DHH user may operate the user's device to send a text message to a particular destination number that may be used by a single number communications controller to receive such codes. The text message may include an assistance suspension code and/or one or more assistance suspension parameters. Alternatively or additionally, the DHH user may operate the user's device to send an unstructured supplementary service data (USSD) code to a particular destination number that may be used by the single number communications controller to receive such codes. In other examples, the DHH user may operate the user's device to send any other type of message (e.g., via an IMS Ut interface) to a particular destination number or system that may be used by the single number communications controller to receive such messages. The user's device may also, or instead, be operated to interact with a single number communications controller system or other system via an application programming interface (API) to provide an assistance suspension code, message, and/or one or more assistance suspension parameters.

For instance, the DHH user may text an assistance suspension code and/or an indication of a time period of suspension to a single number communications controller. In response, the single number communications controller may modify its single number communications data to indicate that one or more entries associated with the DHH user's device (e.g. device or user identifier) in such data are temporarily suspended, causing the single number communications controller to route communications requests that would otherwise correspond to such entries normally. The single number communications controller may include a timestamp, start a timer, and/or otherwise track the length of time that such one or more entries have been suspended. When the associated suspension time period has expired, the single number communications controller may automatically reenable the suspended entry or entries.

In another example, the DHH user may text an assistance suspension code and/or an indication of an indefinite suspension to a single number communications controller. In response, the single number communications controller may modify its single number communications data to indicate that one or more entries associated with the DHH user's device (e.g. device or user identifier) in such data are suspended, causing the single number communications controller to route communications requests that would otherwise correspond to such entries normally. The single number communications controller may maintain this suspension status of these one or more entries until the DHH user send another text that includes an unsuspension code. In response to receiving an unsuspension code, the single number communications controller may reenable the suspended entry or entries.

By facilitating the more efficient and convenient routing of voice calls to assistance systems without requiring the use of another number for other types of communications, systems and methods described herein can improve the performance and increase the efficiency of network resources (and therefore UE resources), while improving the user experience by ensuring that assisted calls are easily and efficiently processed. For example, the methods and systems described herein may be more efficient and/or more robust than conventional techniques utilizing two numbers, as they may increase the efficiency of UE and network resource utilization by initially routing both voice communications and other types of communications properly. This prevents the waste of resources that occurs when users attempt to use a number for a type of communications for which it is not configured (e.g., use an assisted call number for a text or send a text to an assisted call number). This reduces the overall utilization of network resources communications by eliminating unnecessary resource utilization resulting from user number confusion. In addition to improving the efficiency of network and device resource utilization, the systems and methods described herein can provide more robust systems by, for example, making more efficient use of network devices and user devices by reducing unnecessary device and network operations, thereby freeing network and user device resources for more productive operations.

Illustrative environments, signal flows, and techniques for implementing systems and techniques for single number communications accessibility are described below. However, the described systems and techniques may be implemented in other environments.

Illustrative System Architecture

FIG. 1 is a schematic diagram of an illustrative wireless network environment 100 in which the disclosed systems and techniques may be implemented. The environment 100 may include a DHH user device(s) 110 that may communicate (e.g., wirelessly) with a wireless communications network 140 (e.g. via a base station). The DHH user device(s) 110 may include one or more communications devices of any type, such as a UE 111, a computer 112, and a tablet 113, any of which may be configured to interact with the wireless communications network 140 and/or an assistance system such as VRS system 120.

The wireless communications network 140 may be any one or more networks that facilitate communications between devices of various types, such as computing devices and mobile devices (e.g., UEs). Various connections between devices in the network 140 may be wired, wireless, or a combination thereof. In various embodiments, the wireless communications network 140 may facilitate communications with one or more wireless devices, such as UEs. The wireless communications network 140 may facilitate voice and data communications using packet-based communications technologies between such wireless devices and devices on the Internet and/or one or more systems and devices external to the wireless communications network 140. For example, the wireless communications network 140 may facilitate communications between the DHH user device(s) 110 and a hearing user device 162 that may communicate with the wireless communications network 140 from another network via SIP peer 150. The wireless communications network 140 may also, or instead, facilitate communications between the DHH user device(s) 110 and a hearing user device 164 that may communicate with the wireless communications network 140 via a base station 148 configured at the wireless communication network 140 (e.g., the user of device 164 may also be a customer of the wireless communications network 140).

The wireless communications network 140 may also, or instead, facilitate communications between the VRS system 120 and the DHH user device(s) 110. Alternatively or additionally, the VRS system 120 and the DHH user device(s) 110 may communicate via one or more other networks (e.g. transit provider 130). The VRS system may include a VRS system SBC 124 and one or more SIP-enabled devices 122 that allow the VRS system to establish assisted communications between the DHH user device(s) 110 and one or more other devices (e.g., hearing user device 162, 164). The VRS system may also include one or more users 121 that provide assistance by performing sign language/spoken language translations and perform other tasks to facilitate assisted calls. Note that users 121 may be one or more human users, AI processes, machine-learned model execution system, etc.

The wireless communications network 140 may include an SBC 142 that may perform one or more of the single number communications controller operations described herein. The wireless communications network 140 may also, or instead, include a SIP peering SBC 144 that may perform SBC functions while interacting with a peer network, such as SIP peer 150. The SIP peering SBC 144 may also, or instead, perform one or more of the single number communications controller operations described herein. The wireless communications network 140 may also, or instead, include an IP multimedia system or subsystem (IMS) network 146 that facilitates packet data communications between various devices and systems. In examples, the IMS 146 may represent and/or include one or more packet data network (PDNs) of any type. The wireless communications network 140 may also, or instead, include a base station 148 that facilitates wireless communication with user devices, such as hearing user device 164. As will be appreciated, the wireless communications network 140 may include many other devices, systems, components, functions, and connections, not all of which will be described herein. Any of the examples described herein may include any one or more of such devices, systems, components, functions, and connections and/or one or more operations performed thereby.

In examples, communications of various types may be initiated, established, conducted, and facilitated by the various entities illustrated in FIG. 1. For example, text data 172 may be exchanged between the hearing device 162 and one or more of the DHH user devices 110, outside of the wireless communications network 140 using conventional techniques. Similarly, text data 174 may be exchanged between the hearing device 164 and one or more of the DHH user devices 110, outside of the wireless communications network 140 using conventional techniques. One or more transit providers 130 may facilitate the exchange of voice data 176 between the VRS system 120 and the hearing user device 164 so that the VRS system 120 may provide assisted communications (e.g. video data 132 that may include video of interpreted spoken language received as voice data 176) to one or more of the DHH user devices 110.

Data (of any type) intended for or originating at the DHH user device(s) 110 may transit the wireless communication network 140. For example, the hearing user device 162 may transmit voice or text data 182 via the SIP peer 150 to the wireless communications network 140. The SIP peering SBC 144 may be configured to receive and process peer traffic from the SIP peer 150. For example, the SIP peering SBC 144 may perform one or more single number communications controller operations using single number communications data to determine whether to route such traffic normally or to direct such traffic to an assistance system, such as the VRS system 120. Alternatively or additionally, the SIP peering SBC 144 may be configured to determine another component or system to direct such traffic to for further processing. For example, the SIP peering SBC may determine that voice or text data 182 received from the hearing user device 162 may be destined for the DHH user device(s) 110 and may, in response, direct such traffic to the SBC 142 as voice or text data 186 for further processing.

The SBC 142 may, based on voice or text data 186 associated with the DHH user device(s) 110, perform one or more single number communications controller operations using single number communications data to determine whether to route such traffic normally or to direct such traffic to an assistance system. If the SBC 142 determines that voice or text data 186 associated with the DHH user device(s) 110 is to be routed normally because, for example, the data 186 is text data, the SBC 142 may transmit such text data (e.g., including via other connections and/or components as needed, not shown) to the DHH user device(s) 110 as text data 192. The SBC 142 may further facilitate the exchange of text data with the hearing user device 162 (e.g. via the SIP peering SBC 144 and/or the SIP peer 150). In examples, the one or more single number communications controller operations may be performed within the IMS 146 (e.g., by a CSCF configured at the IMS 146, a telephony application server (TAS) configured at the IMS 146, etc.).

If the SBC 142 determines that voice or text data 186 associated with the DHH user device(s) 110 is voice data because, for example, the data 186 is a request to establish a voice call between the hearing user device 162 and the DHH user device(s) 110, the SBC 142 may determine whether an assistance system is associated with the DHH user device(s) 110 in single number communications data and/or whether there is single number communications routing configuration for the DHH user device(s) 110. As described in more detail herein, the SBC 142 may determine whether an entry exists in a data structure that indicates that voice calls requested for the DHH user device(s) 110 should be directed to an assistance system, such as VRS system 120. If not, the SBC 142 may process the voice communications request normally.

If the SBC 142 determines, based on single number communications data, that voice communication requests associated with DHH user device(s) 110 are to be routed to an assistance system, the SBC 142 may route the request accordingly. For example, the SBC 142 may transmit the request via a SIP trunk or an application programming interface (API) 134 to the VRS system 120 VRS system SBC 124. The VRS system SBC 124 may then establish a call between the DHH user device(s) 110 and the hearing user device 162, for example, by establishing a voice communications session connecting the SIP device 122 to the hearing user device 162 to exchange via voice data 194 with an interpreter 121, and then establishing a video communications session between the SIP device 122 and the DHH user device(s) 110 to exchange video data 132. The requested voice call may then be facilitated by the VRS system 120.

In another example, the DHH user device(s) 110 may transmit a communications request requesting communications with the hearing user device 162. This request may be received at the SBC 142. If such a request is text data transmission request or other non-voice communications request, the SBC 142 may process it normally. However, if the request received is a request to establish voice communications (e.g., voice request 196), the SBC 142 may perform one or more single number communications controller operations using single number communications data to determine whether to route such traffic normally or to direct such traffic to an assistance system, such as the VRS system 120. If the SBC 142 determines that voice request 196 is to be routed normally because, for example, the DHH user device(s) have suspended assisted calling (as described in more detail herein), the SBC 142 may transmit and/or process such data normally to establish a voice call.

However, if the SBC 142 determines that voice request 196 is a voice data communications request and that it is to be routed to an assistance system, such as the VRS system 120, the SBC 142 may route the request accordingly. For example, the SBC 142 may transmit the request via the SIP trunk or API 134 to the VRS system SBC 124, which may perform operations to establish a call between the DHH user device(s) 110 and the hearing user device 162, for example, by establishing a video communications session connecting the SIP device 122 to the DHH user device(s) 110 to exchange via video data 132 with an interpreter 121, and then establishing a voice communications session between the SIP device 122 and the user device 162 (e.g., via the SBC 142, the SIP peering SBC 144, and/or the SIP peer 150) to exchange voice data 194. The voice call to the hearing user device 162 requested by the DHH user device(s) 110 may then be facilitated by the VRS system 120.

In other examples, data (of any type) may be exchanged between the DHH user device(s) 110 and other users (e.g., customers) of the wireless communication network 140. For example, the hearing user device 164 may be a device operated by a customer of the operator of the wireless communications network 140. Accordingly, the hearing user device 164 may transmit voice or text data 184 with, for example, the DHH user device(s) 110 (e.g., an identifier of the DHH user device(s) 110) as a destination, to the wireless communications network 140 via the base station 148, which may facilitate transmission of the voice or text data 184 to the IMS network 146. The IMS network 146 may direct such traffic to the SBC 142 as voice or text data 188 for further processing.

The SBC 142 may, based on voice or text data 188 associated with the DHH user device(s) 110, perform one or more single number communications controller operations using single number communications data to determine whether to route such traffic normally or to direct such traffic to an assistance system. If the SBC 142 determines that voice or text data 188 associated with the DHH user device(s) 110 is to be routed normally because, for example, the data 188 is text data, the SBC 142 may transmit such text data (e.g., including via other connections and/or components as needed, not shown) to the DHH user device(s) 110 as text data 192. The SBC 142 may further facilitate the exchange of text data with the hearing user device 164 (e.g. via the IMS network 146 and/or the base station 148).

If the SBC 142 determines that voice or text data 188 associated with the DHH user device(s) 110 is voice data (e.g., the data 188 is a request to establish a voice call between the hearing user device 164 and the DHH user device(s) 110), the SBC 142 may determine whether an assistance system is associated with the DHH user device(s) 110 in single number communications data and/or whether there is single number communications routing configuration for the DHH user device(s) 110. As described in more detail herein, the SBC 142 may determine whether an entry exists in a data structure that indicates that voice calls requested for the DHH user device(s) 110 should be directed to an assistance system, such as VRS system 120. If not, the SBC 142 may process the voice communications request normally.

If the SBC 142 determines, based on single number communications data, that voice communication requests associated with DHH user device(s) 110 are to be routed to an assistance system, the SBC 142 may route the request accordingly. For example, the SBC 142 may transmit the request received at data 188 via the SIP trunk or API 134 to the VRS system 120 VRS system SBC 124. The VRS system SBC 124 may then establish a call between the DHH user device(s) 110 and the hearing user device 164, for example, by establishing a voice communications session connecting the SIP device 122 to the hearing user device 164 to exchange via voice data 194 with an interpreter 121, and then establishing a video communications session between the SIP device 122 and the DHH user device(s) 110 to exchange video data 132. The requested voice call may then be facilitated by the VRS system 120.

In another example, the DHH user device(s) 110 may transmit a communications request requesting communications with a customer device associated with the wireless communications network 140, such as the hearing user device 164. This request may be received at the SBC 142. If such a request is text data transmission request or other non-voice communications request, the SBC 142 may process it normally. However, if the request received is a request to establish voice communications (e.g., voice request 196), the SBC 142 may perform one or more single number communications controller operations using single number communications data to determine whether to route such traffic normally or to direct such traffic to an assistance system, such as the VRS system 120. If the SBC 142 determines that voice request 196 is to be routed normally because, for example, the DHH user device(s) have suspended assisted calling (as described in more detail herein), the SBC 142 may transmit and/or process such data normally to establish a voice call.

However, if the SBC 142 determines that voice request 196 is a voice data communications request and that it is to be routed to an assistance system, such as the VRS system 120, the SBC 142 may route the request accordingly. For example, the SBC 142 may transmit the request via the SIP trunk or API 134 to the VRS system SBC 124, which may perform operations to establish a call between the DHH user device(s) 110 and the hearing user device 164, for example, by establishing a video communications session connecting the SIP device 122 to the DHH user device(s) 110 to exchange via video data 132 with an interpreter 121, and then establishing a voice communications session between the SIP device 122 and the user device 164 (e.g., via the SBC 142, the IMS network 146, and/or the base station 148) to exchange voice data 194. The voice call to the hearing user device 164 requested by the DHH user device(s) 110 may then be facilitated by the VRS system 120.

Illustrative Signal Flows

Figure 2:
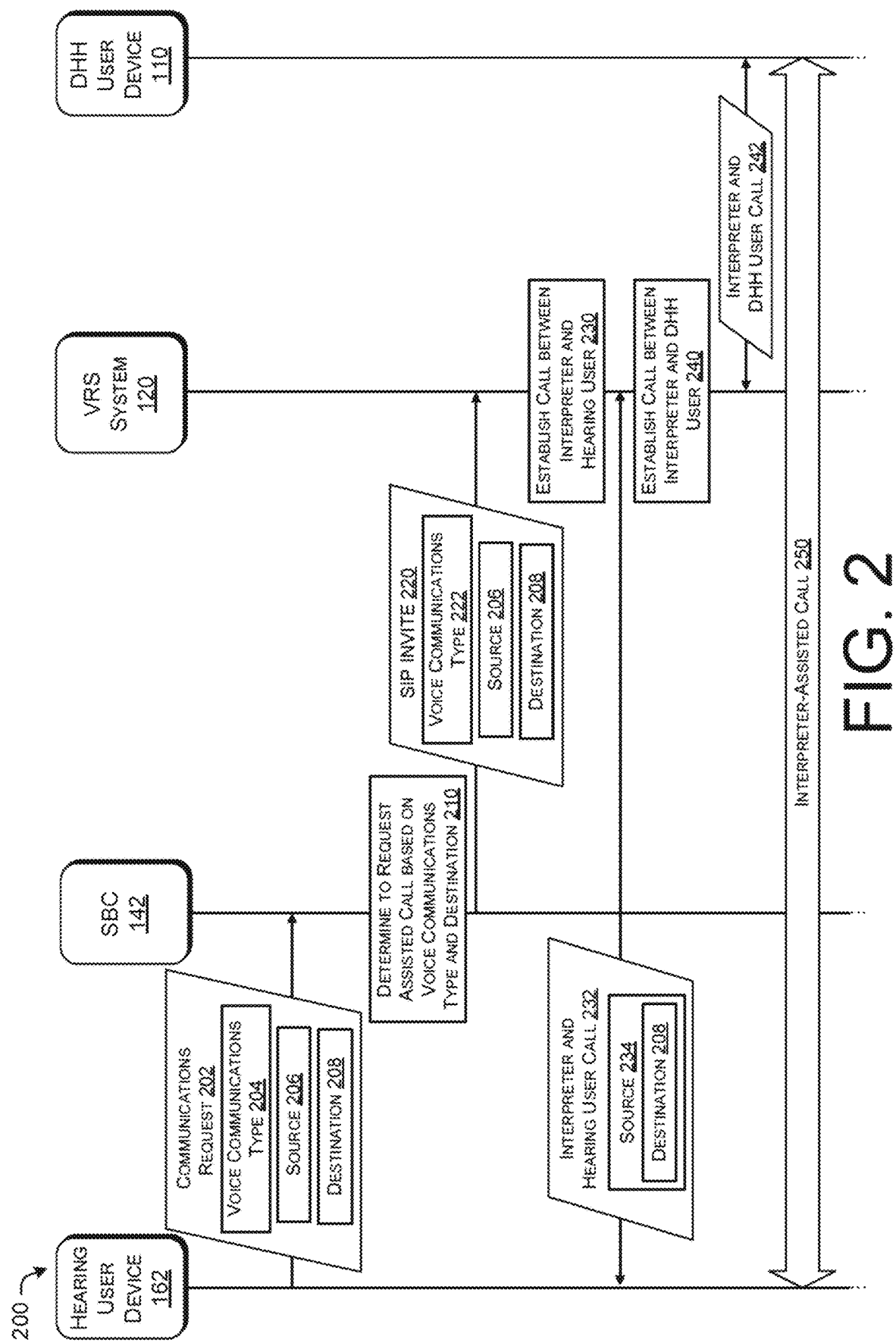
FIG. 2 is a diagram of an illustrative signal flow associated with systems and techniques for single number communications accessibility, in accordance with examples of the disclosure.

FIG. 2 illustrates an exemplary signal flow 200 of various messages that may be exchanged in one or more of the disclosed systems and techniques for single number communications accessibility. Reference will be made in this description of the signal flow 200 to devices, entities, and interfaces illustrated in FIG. 1 and described in regard to that figure. However, the operations, signals, and signal flow illustrated in FIG. 2 and described herein may be implemented in any suitable system and/or with any one or more suitable devices and/or entities. Moreover, any of the operations, signals, and/or entities described in regard to FIG. 2 may be used separately and/or in conjunction with other operations, signals, and/or entities. All such embodiments are contemplated as within the scope of the instant disclosure.

Signal flow 200 illustrates an example of signals that may be exchanged and operations that may be performed based on a user device requesting the establishment of a voice call between the user device and a DHH user device according to systems and techniques disclosed herein. In this example, hearing user device 162 may transmit a communications request 202 to a wireless communications network where it may be received at SBC 142. The communications request 202 may be any type of communications request, including a request to establish a packet-based voice communications session. The communications request 202 may include a voice communications type 204 indicating that the communications request 202 is requesting the establishment of a voice communications session. The communications request 202 may further include an indication of a source 206, which may be an identifier for the user device 162, such as a telephone number, IMSI, MSISDN, network address, etc. The communications request 202 may further include an indication of a destination 208, which may be an identifier for a device with which the hearing user device 162 is requesting establishment of a communications session, in this example, the DHH user device 110. The destination identifier may also be an identifier such as a telephone number, IMSI, MSISDN, network address, etc. In various examples, the communications request 202 may be a SIP INVITE message.

The SBC 142, at operation 210 and based on the request 202, may determine that the request 202 is a request for a voice call and is associated with an entry in single number communications data indicating that an assistance system is to be used for the requested call. For example, the entry in the single number communications data may indicate that voice calls associated with the destination 208 and/or the DHH user device 110 are to be routed to a VRS system 120. In various examples, the single number communications data used to make this determination may be iFC data stored at a CSCF (e.g., executing at the SBC or other component). In examples, the CSCF and/or one or more other components of the SBC 142 may download or otherwise obtain iFC data from an HSS and/or from one or more other systems or components and use such data to evaluate requests as described herein.

In response to determining that the VRS system 120 is to be used to facilitate voice calls such as that requested by the communications request 202, the SBC 142 may transmit a SIP INVITE 220 to the VRS system 120 that includes a voice communications type 222 indication and/or related data, the source 206, and the destination 208.

At operation 230, based on the SIP INVITE 220, the VRS system 120 may establish a communications session between an interpreter and the user initiating the request for a communications session, in this case the hearing user associated with the hearing user device 162 (e.g., between their respective devices). This session may be a voice session or may be a video and audio data session allowing the hearing user to also view the interpreter and/or the DHH user associated with the DHH user device 110. The VRS system 120 (e.g., an SBC at the VRS system 120, such as the VRS system SBC 124) may establish the call using the DHH user device identifier (e.g., telephone number) as the source address so that the user of the hearing user device 162 may see that the call is associated with the user of the DHH user device 110. For example, as shown here, the VRS system 120 may establish a call 232 between the hearing user device 162 and the VRS system 120 with a source 234 that is the destination 208 associated with the DHH user device 110 from the initial request 202.

At operation 240, based on successful establishment of the call 232, the VRS system 120 may establish a communications session between the interpreter and the DHH user associated with the DHH user device 110 (e.g., between their respective devices). This session may be a video data session allowing the DHH user to view the interpreter. This communications session may also allow the DHH user to view the hearing user operating the hearing user device 162. For example, as shown here, the VRS system 120 may establish a call 242 between the DHH user device 110 and the VRS system 120 that may be a video call and/or otherwise include video data allowing the DHH user operating the DHH user device 110 to view the interpreter at the VRS system 120.

Based on successful establishment of the call 242, the VRS system 120 may establish a communications session connecting the interpreter at the VRS system 120 with both the DHH user associated with the DHH user device 110 and the hearing user associated with the hearing user device 162 (e.g., communicatively connecting their respective devices). The VRS system 120 may then facilitate this interpreter-assisted call 250.

Figure 3:
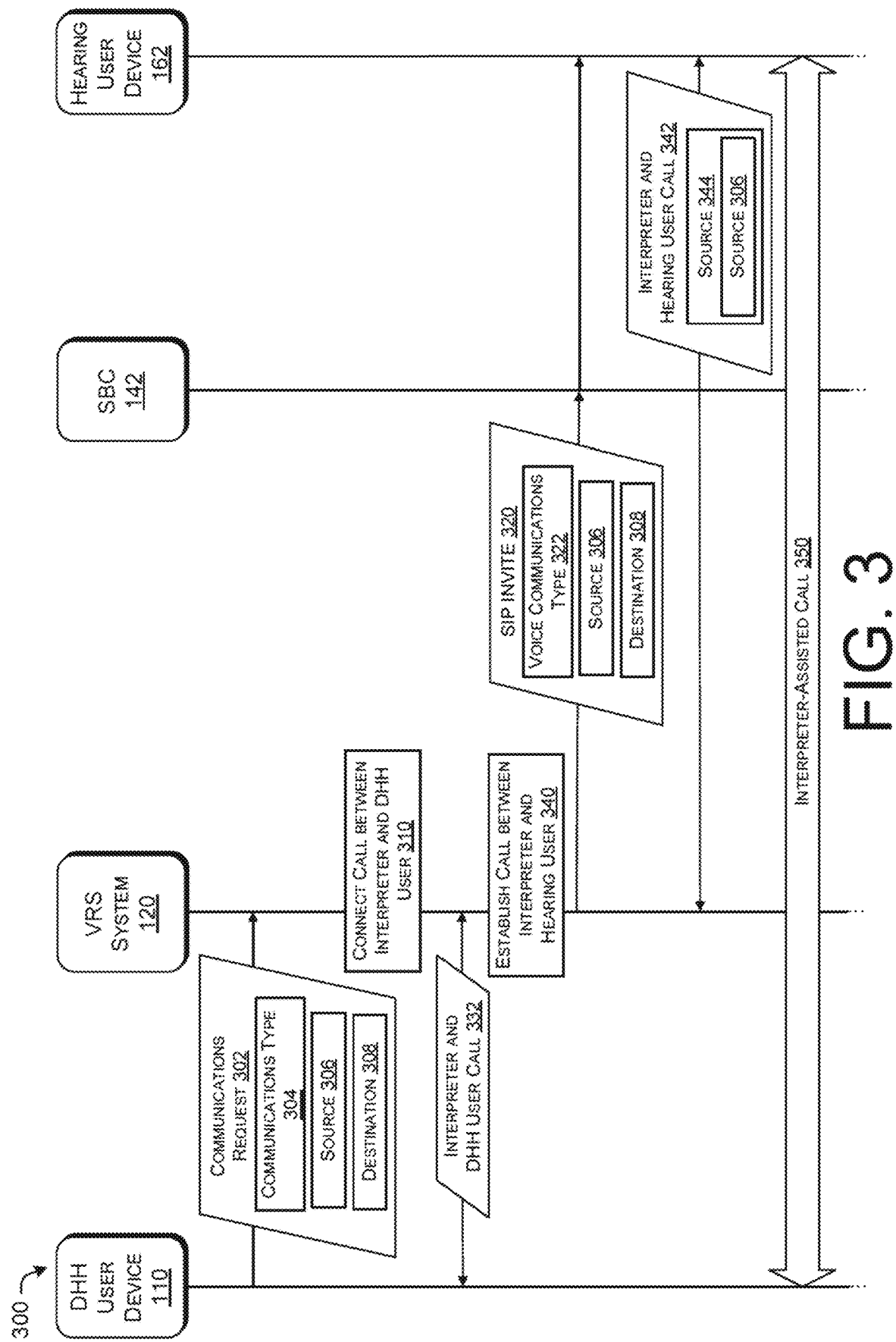
FIG. 3 is a diagram of an illustrative signal flow associated with systems and techniques for single number communications accessibility, in accordance with examples of the disclosure.

FIG. 3 illustrates an exemplary signal flow 300 of various messages that may be exchanged in one or more of the disclosed systems and techniques for single number communications accessibility. Reference will be made in this description of the signal flow 200 to devices, entities, and interfaces illustrated in FIG. 1 and described in regard to that figure. However, the operations, signals, and signal flow illustrated in FIG. 3 and described herein may be implemented in any suitable system and/or with any one or more suitable devices and/or entities. Moreover, any of the operations, signals, and/or entities described in regard to FIG. 3 may be used separately and/or in conjunction with other operations, signals, and/or entities. All such embodiments are contemplated as within the scope of the instant disclosure.

Signal flow 300 illustrates an example of signals that may be exchanged and operations that may be performed based on a DHH device requesting the establishment of a voice or video call between the DHH user device and another user device (e.g., hearing user device) according to systems and techniques disclosed herein. In this example, DHH user device 110 may transmit a communications request 302 to a wireless communications network where it may be received at VRS system 120. Note that in some examples, the communications request 302 may be transmitted to the SBC 142 (e.g., initially), which may then provide the communications request 302 to the VRS system 120. The SBC 142 may passively relay or otherwise act as a pass-through for the communications request 302. In other examples, the communications request 302 may be transmitted to the VRS system 120 directly and/or via one or more other components.

The communications request 302 may be any type of communications request, including a request to establish a packet-based voice communications session. The communications request 302 may include a communications type 304 indicating that the communications request 302 is requesting the establishment of a video communications session. In other examples, the communications type 304 may be a voice communications type that the VRS system 120 may recognize corresponds to a video communications session because the request 302 is received from the DHH user device 110. The communications request 302 may further include an indication of a source 306, which may be an identifier for the DHH user device 110, such as a telephone number, IMSI, MSISDN, network address, etc. The communications request 302 may further include an indication of a destination 308, which may be an identifier for a device with which the DHH user device 110 is requesting establishment of a communications session, in this example, the hearing user device 162. The destination identifier may also be an identifier such as a telephone number, IMSI, MSISDN, network address, etc. In various examples, the communications request 302 may be a request to establish an assisted call facilitated by an assistance system or a video call with the hearing user device 162 indicated as the destination. In other examples, the communications request 302 may be a SIP INVITE. In still other examples, the communications request 302 may be a communication to an API (e.g., HTTP API) and/or other communication using one or more other protocols.

The VRS system 120, at operation 310 and based on the request 302, may establish a call or communications session 332 between the VRS 120 and the DHH user device 110 (e.g., between an interpreter at the VRS system 120 and the user of the DHH user device 110). The communications session 332 between the interpreter and the user initiating the request for a communications session may be a video session or may be a video and audio data session allowing the DHH user to view the interpreter and, in some examples ultimately the hearing user associated with the hearing user device 162. For example, as shown here, the VRS system 120 may establish a video call 332 between the DHH user device 110 and the VRS system 120. Establishing the video call 332 ma include interaction with one or more other components, including in some examples, the SBC 142 and, in other examples, one or more other components in addition to, or instead of, the SBC 142.

The VRS system 120 may also determine that the request 302 is a request for a voice call and determine, at operation 340, to establish a call between the VRS system 120 (e.g., an interpreter at the VRS system 120) and the device associated with the destination 308 (e.g., the hearing user device 162). The VRS system may generate the SIP INVITE 320 requesting establishment of a communications session (e.g. voice call) based on the source 306, destination 308, and a voice communications type 322. The VRS system 120 may transmit the SIP INVITE 320 to the SBC 142 requesting the establishment of a call between the VRS system 120 and the hearing user device 162. The SBC 142 may relay or otherwise transmit the SIP invite 320 to the hearing user device 162.

Based on the SIP invite 320, the SBC 142 may facilitate the establishment of a communications session 342 between the VRS system 120 (e.g., the interpreter at the VRS 120) and the hearing user device 162 (e.g., the hearing user operating the hearing user device 162). This session may be established based on VRS system 120 interaction with or otherwise via the SBC 142. This session may be a voice session or an audio and video data session allowing the hearing user to view the interpreter and/or the DHH user. The VRS system 120 (e.g., an SBC at the VRS system 120, such as the VRS system SBC 124) may establish the call using the DHH user device identifier (e.g., telephone number) as the source address so that the user of the hearing user device 162 may see that the call is associated with the user of the DHH user device 110. For example, as shown here, the VRS system 120 may establish a call 342 between the hearing user device 162 and the VRS system 120 (e.g., via the SBC 142) that may be a voice call or a video and audio data communications session.

In examples, the VRS system 120 may use the DHH user device identifier (e.g., telephone number) as the source address so that the user of the hearing user device 162 may see that the call is associated with the user of the DHH user device 110. For example, as shown here, the VRS system 120 may establish a call 342 between the hearing user device 162 and the VRS system 120 with a source 344 that is the source 306 associated with the DHH user device 110 from the initial request 302 and/or as indicated in the SIP invite 320.

Based on successful establishment of the call 342, the VRS system 120 may establish a communications session connecting the interpreter at the VRS system 120 with both the DHH user associated with the DHH user device 110 and the hearing user associated with the hearing user device 162

(e.g., communicatively connecting their respective devices). The VRS system 120 may then facilitate this interpreter-assisted call 350.

Figure 4:
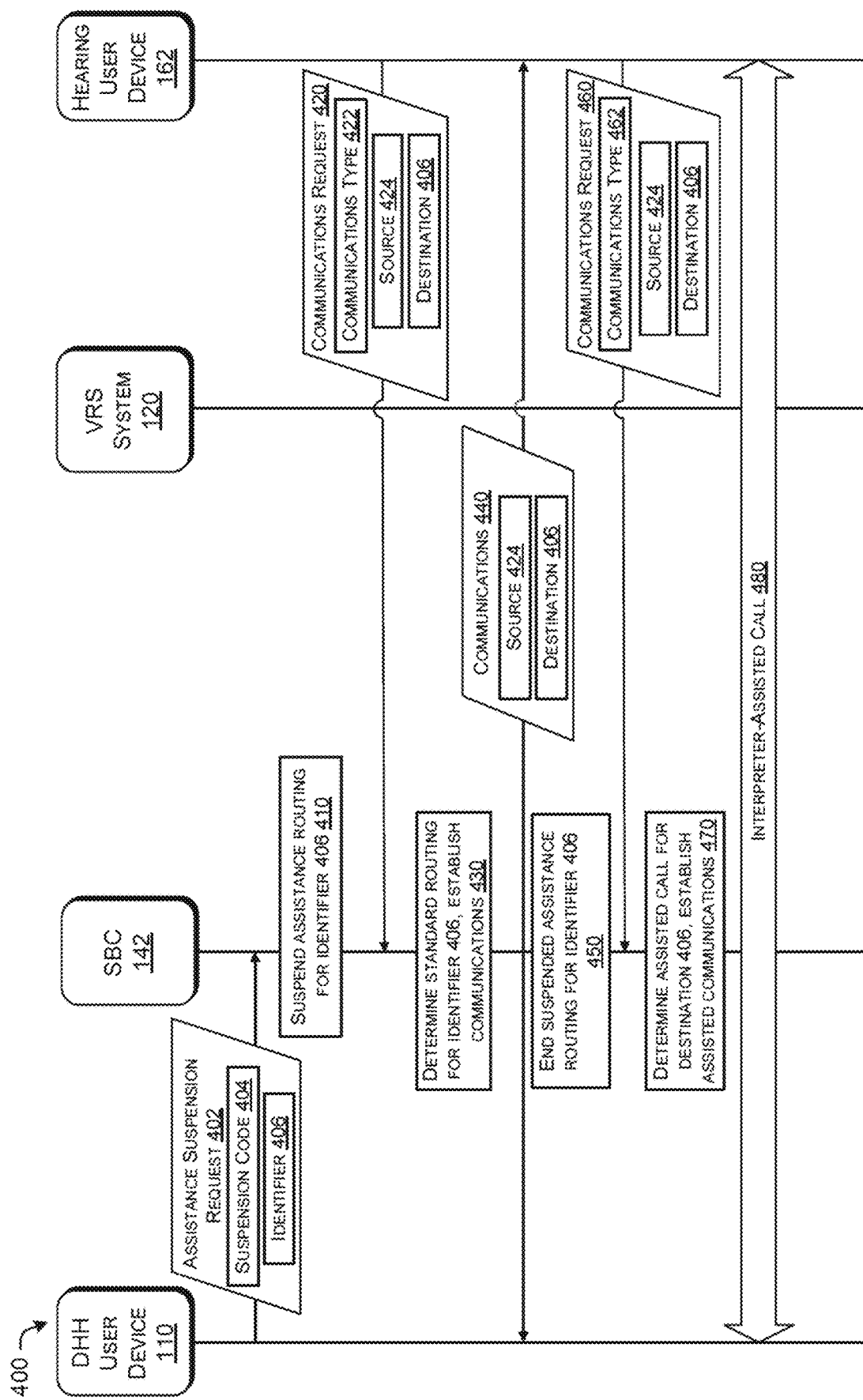
FIG. 4 is a diagram of an illustrative signal flow associated with systems and techniques for single number communications accessibility, in accordance with examples of the disclosure.

FIG. 4 illustrates an exemplary signal flow 400 of various messages that may be exchanged in one or more of the disclosed systems and techniques for single number communications accessibility. Reference will be made in this description of the signal flow 400 to devices, entities, and interfaces illustrated in FIG. 1 and described in regard to that figure. However, the operations, signals, and signal flow illustrated in FIG. 4 and described herein may be implemented in any suitable system and/or with any one or more suitable devices and/or entities. Moreover, any of the operations, signals, and/or entities described in regard to FIG. 4 may be used separately and/or in conjunction with other operations, signals, and/or entities. All such embodiments are contemplated as within the scope of the instant disclosure.

Signal flow 400 illustrates an example of signals that may be exchanged and operations that may be performed based on a DHH user device requesting the suspension of assistance system usage with voice calls associated with the DHH user device according to systems and techniques disclosed herein. In this example, DHH user device 110 may transmit an assistance suspension request 402 to a wireless communications network where it may be received at SBC 142. Note that in examples, the assistance suspension request 402 may also, or instead, be received at a CSCF and/or HSS that may implement the assistance suspension operations described herein. The assistance suspension request 402 may take any suitable form, such as a text message, short messaging service (SMS) message, multi-media messaging service (MMS) message, etc. In some examples, the request 402 may be generated and transmitted by an application (e.g., installed and/or executed at a user device) in response to user activation of one or more controls (e.g., configured at a user interface presented to the user).

The assistance suspension request 402 may include a suspension code 404 and an indication of an identifier 406, which may be an identifier for the DHH user device 110, such as a telephone number, IMSI, MSISDN, network address, etc. The suspension code 404 may be any form of code, including an alphanumeric string or sequence of characters of any length or combination or any other type of code that may be recognized by the SBC 142. The suspension code 404 may include one or more parameters associated with the suspension request 402. For example, the suspension code may be a code that indicates that assistance system routing for the associated identifier 406 should be suspended. In such examples, the suspension of assistance routing may be maintained until a subsequent suspension code (e.g., the same code or a different code) is received at the SBC 142 that indicates that assistance routing should be restored. This may allow a user to toggle assistance routing on and off as desired. Alternatively or additionally, the suspension code 404 may be a code that indicates that assistance system routing for the associated identifier 406 should be suspended for a defined period of time. For example, there may be a predefined default period of suspension time associated with one or more suspension codes. Alternatively or additionally, the suspension code 404 may indicate the period of suspension time requested by the user (e.g., may represent a parameter indicating a period of suspension time).

At operation 410, in response to the assistance suspension request 402, the SBC 142 may suspend assistance routing for the identifier 406 (e.g., when the destination number or identifier for a communications request is associated with the device associated with the identifier 406 (e.g., DHH user device 110)). This may take the form of modifying an entry in single number communications data associated with the identifier 406 and/or associated with any other information that may be associated with the identifier 406 and/or the DHH user device 110. In some examples, this may take the form of disabling iFC data associated with the identifier 406 and/or the DHH user device 110 at a CSCF (e.g., configured at or otherwise associated with the SBC 142).

While the assistance routing is disabled for the DHH user device 110 and/or its associated identifier 406, a communications request 420 may be received at the SBC 142 from the hearing user device 162. The communications request 420 may include an indication of requested communications type 422, a destination 406 that may be the identifier 406 associated with the DHH user device 110, and a source 424 that may, for example, be associated with the hearing user device 162. At operation 430, the SBC 142 may use standard routing and other normal operations to establish communications 440 between the DHH user device 110 and the hearing used device 162, for example, using the source 424 and destination 406.

At operation 450, the SBC 142 may determine that the assistance routing suspension implemented at operation 410 has expired. Alternatively or additionally, the SBC 142 may detect and/or determine one or more events and/or conditions that indicate that the assistance routing suspension implemented at operation 410 should be removed (e.g., assistance routing should be restored). For example, the SBC 142 may receive a subsequent suspension code requesting restoration of the assistance routing or otherwise toggling the assistance routing back "on" for the identifier 406 and/or the DHH user device 110.

In response to this determination at operation 450, the SBC may reenable assistance routing for the DHH user device 110 and/or the identifier 406. This may take the form of modifying an entry in single number communications data associated with the identifier 406 and/or associated with any other information that may be associated with the identifier 406 and/or the DHH user device 110. In some examples, this may take the form of enabling or reconfiguring iFC data associated with the identifier 406 and/or the DHH user device 110 at a CSCF (e.g., configured at the SBC 142). The SBC 142 may then resume routing for the DHH user device 110 and/or the source 406 based on assistance routing rules and/or single number communications data (e.g., reenabled or reconfigured iFC data associated with the DHH user device 110 and/or the identifier 406).

The SBC 142 may receive a communications request 460 from the hearing user device 162 after reenabling assistance routing for the DHH user device 110 and/or the identifier 406. The communications request 460 may include an indication of requested communications type 462, the destination 406 that may be the identifier 406 associated with the DHH user device 110, and the source 424 associated with the hearing user device 162. At operation 470, the SBC may determine that the communications type 462 indicates a voice call and that assistance routing should be used to establish the call (e.g., as described herein) based on the identifier/destination 406. In response, the SBC 142 may use the disclosed systems and techniques to establish an interpreter-assisted call 480 between the DHH user device 110 and the hearing user device 162 that includes the VRS system 120.

Illustrative Functions and Communications

Figure 5:
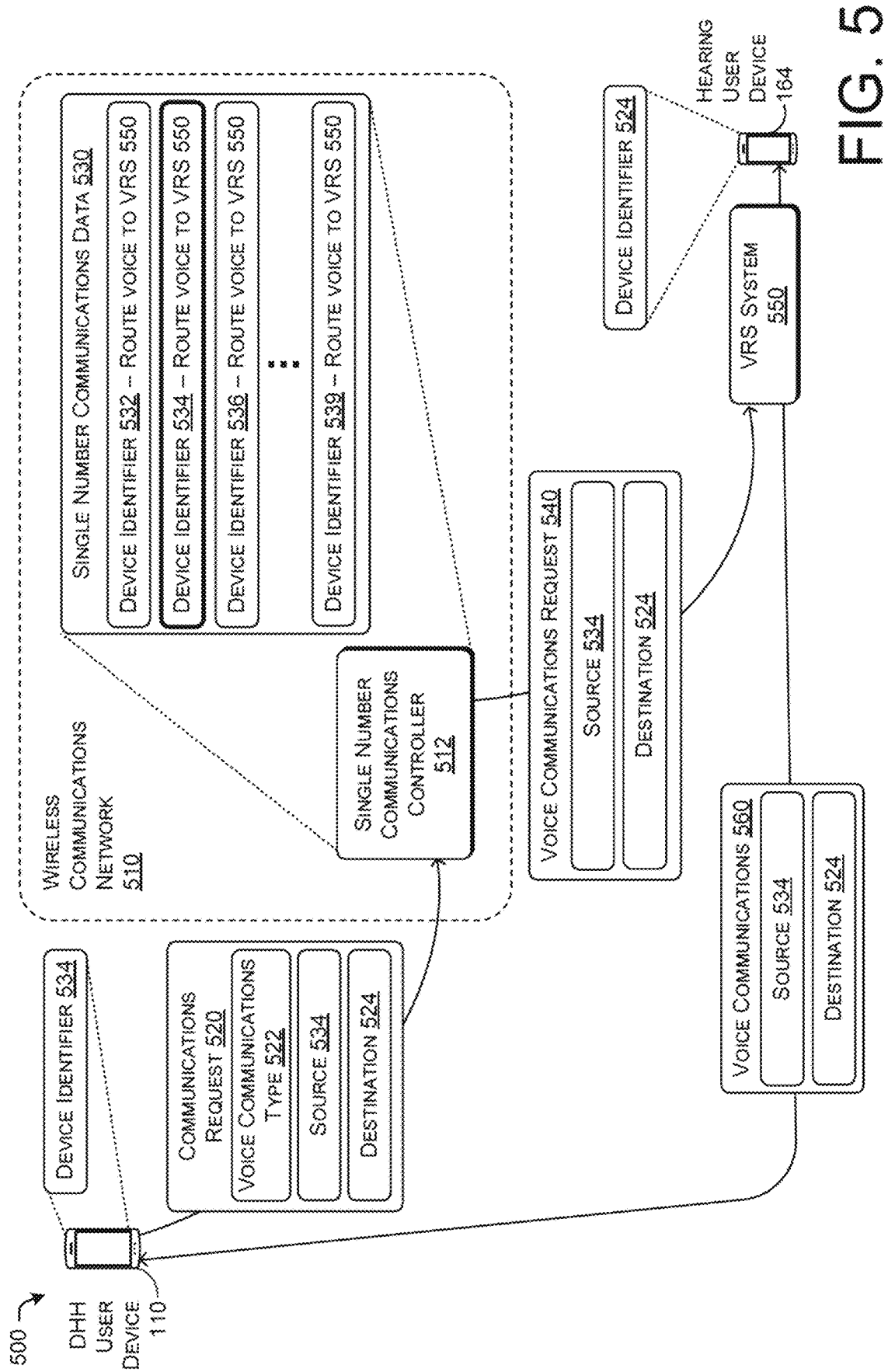
FIG. 5 is a schematic diagram of illustrative functions and communications that may be implemented in a wireless communications network in which systems and methods for single number communications accessibility may be implemented, in accordance with examples of the disclosure.
Figure 6:
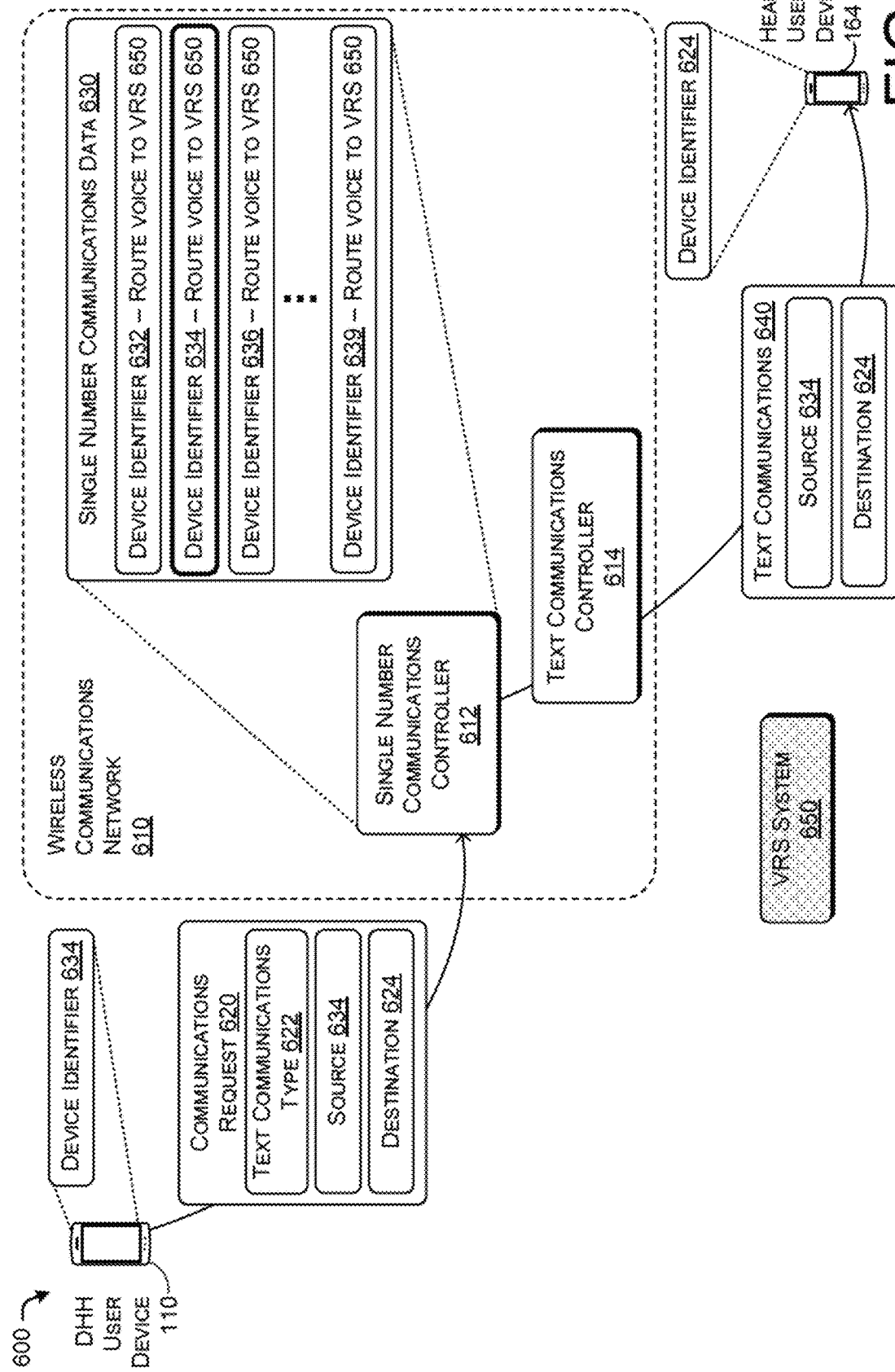
FIG. 6 is a schematic diagram of illustrative functions and communications that may be implemented in a wireless communications network in which systems and methods for single number communications accessibility may be implemented, in accordance with examples of the disclosure.
Figure 7:
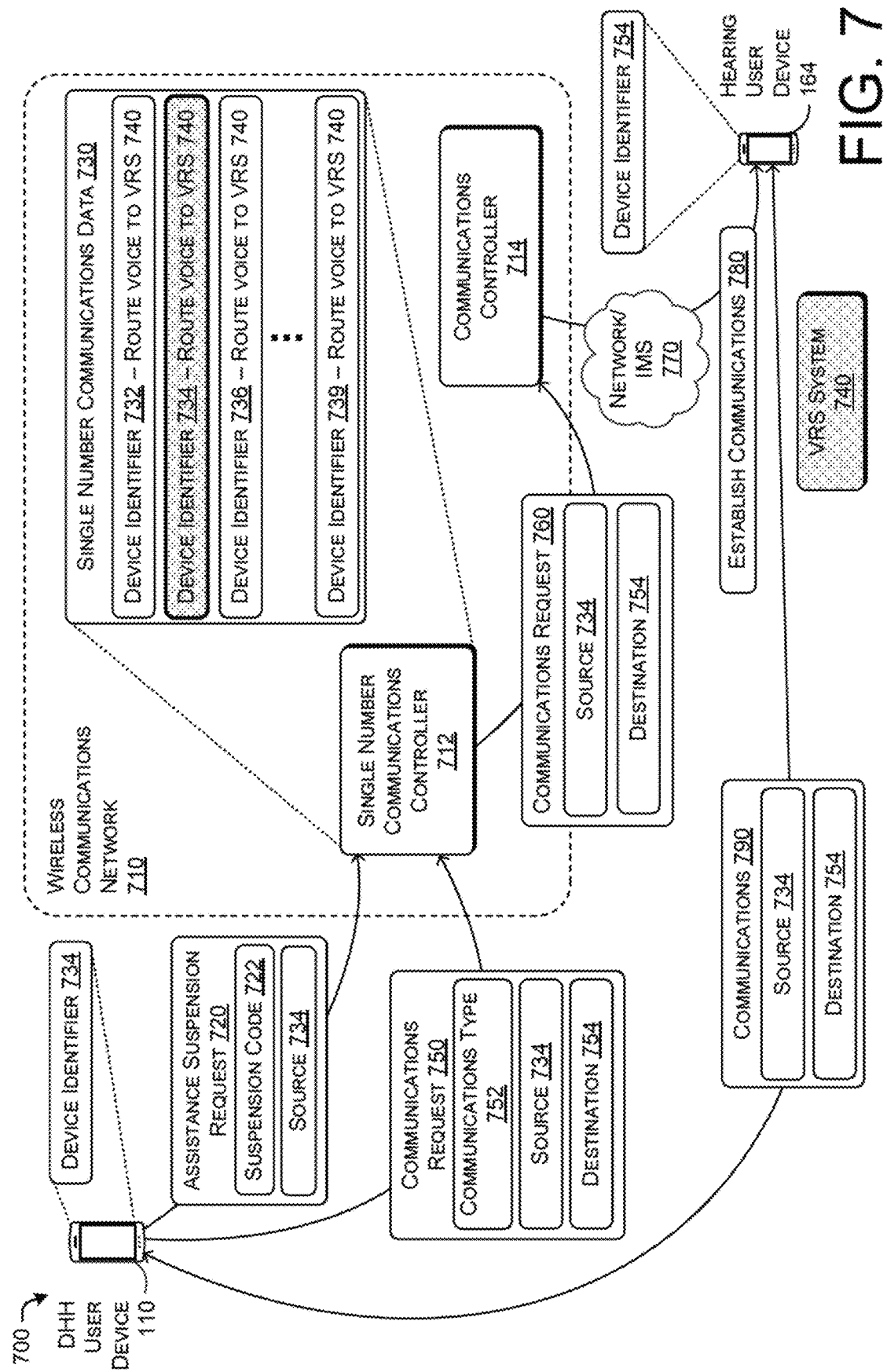
FIG. 7 is a schematic diagram of illustrative functions and communications that may be implemented in a wireless communications network in which systems and methods for single number communications accessibility may be implemented, in accordance with examples of the disclosure.

FIGS. 5-7 illustrate schematic diagrams of exemplary functions and communications of various messages that may be exchanged in one or more of the disclosed systems and techniques for single number communications accessibility as described herein. Reference may be made in this description of the exemplary functions and communications to devices, messages, functions, components, and/or operations illustrated in FIG. 1 and described in regard to that figure. However, the functions and communications illustrated in FIGS. 5-7 and described herein may be implemented in any suitable system and/or with any one or more suitable devices and/or entities. Moreover, any of the functions and communications described in regard to FIGS. 5-7 may be used separately and/or in conjunction with other functions and communications and/or implemented using any one or more devices, systems, operations, and any combination thereof. All such embodiments are contemplated as within the scope of the instant disclosure.

FIG. 5 illustrates a schematic diagram 500 that may represent a subset of the functions and components represented in environment 100 of FIG. 1. In this example, a request for an assisted voice call may be processed. A wireless communications network 510 may include a single number communications controller 512. The single number communications controller 512 may be configured as a dedicated component and/or function in the wireless communications network 510. Alternatively, the single number communications controller 512 may be configured at an SBC, CSCF, and/or as a function and/or component of any other one or more other network components. The DHH user device 110 may be in communication with the wireless communications network 510 and, in particular, with the single number communications controller 512 (e.g., via a base station and/or one or more other network components). A VRS system 550 may also, or instead, be in communication with the wireless communications network 510 and, in particular, with the single number communications controller 512 (e.g., via a SIP trunk, a data connection (e.g., facilitating data exchange using an API at the VRS system 550), and/or one or more other network components). The hearing user device 164 may also, or instead, be in communication with the wireless communications network 510 directly or indirectly (e.g., via the VRS system 550 during an assisted call).

The single number communications controller 512 may be configured with and/or have access to single number communications data 530. In various examples, the single number communications data 530 may be one or more data structures that may be used by the single number communications controller 512 to determine single number communications operations. For instance, the single number communications data 530 may represent one or more entries indicating particular devices, numbers (e.g., telephone numbers, IMSIs, MSISDNs, etc.), addresses (e.g., network addresses, IP addresses, etc.), users, and/or other identifying information entities that may be associated with assisted communications. In particular examples, the single number communications data 530 may include iFC data that may be used to associate particular devices, numbers, etc. with assisted communications. In various examples, such iFC data may be generated and stored at an HSS and may be loaded onto the single number communications controller 512 (e.g., during CSCF registration where the single number communications controller 512 includes a CSCF). Such iFC data may otherwise be accessible to and/or configured at the single number communications controller 512 (e.g., by a CSCF function configured at the single number communications controller 512).

In examples, the single number communications data 530 may include any number of entries, such as the illustrated entries associated with device identifiers 532-539. Individual such entries may include an indication of an entity (e.g., device, number, etc.) and one or more assistance parameters. Assistance parameters may include an indication of an assistance service or system, such as a VRS system. Alternatively, individual entries represented in the single number communications data 530 may be associated with a default assistance service or system that may not be represented in the individual entries.

In examples, data in the single number communications data 530 may be added, removed, and/or modified by a DHH user and/or a VRS system. For example, the user of the DHH user device 110 may request a single number communications routing configuration for the DHH user device 110 identifier 534. Alternatively or additionally, an operator of the VRS system 550 may request a single number communications routing configuration for the DHH user device 110 identifier 534 (e.g., where the DHH user has interacted with the VRS system 550 separately to configure the VRS system 550 to assist with communications for the DHH user device 110). Such a configuration request may be provided to an operator of the wireless communications network 510 and/or the single number communications controller 512 via data generated by an application with which the DHH user and/or the operator of the VRS system 550 interacts. For example, a graphical user interface may be presented to the DHH user and/or the VRS system operator that, in response to activation of one or more controls by the user and/or operator, causes an underlying application to generate a configuration request with data that may then be used by the single number communications controller 512 and/or an associated device (e.g., HSS) to add, modify, or remove data in the single number communications data 530.

The DHH user device 110 may transmit a communications request 520 to the wireless communications network 510 where it may be received at the single number communications controller 512. The communications request 520 may be any type of communications request, including a request to establish a packet-based voice communications session. The communications request 520 may include a voice communications type 522 indicating that the communications request 520 is requesting the establishment of a voice communications session. The communications request 520 may further include an indication of a source 534, which may be the device identifier 534 for the DHH user device 110. The communications request 520 may further include an indication of a destination 524, which may be a device identifier 524 for the hearing user device 164. In various examples, the communications request 520 may be a SIP INVITE message.

The single number communications controller 512 may evaluate the communications request 520 to determine the appropriate operations. In examples, the single number communications controller 512 may determine whether the request 520 is a request for voice communications and, if not, may process the request 520 based on normally applicable operations for the associated request type. In the illustrated example, the single number communications controller 512 may determine, based on the voice communications type 522, that the communications request 520 is a request for a voice call. Based on this determination, the single number communications controller 512 may determine whether the source 534 is represented in the single number communications data 530. If not, the single number communications controller 512 may process the request 520 based on normally applicable voice call establishment operations. In the illustrated example, the single number communications controller 512 may identify the entry in the single number communications data 530 associated with the device identifier/source 534. Based on this entry, the single number communications controller 512 may determine that voice calls associated with the device identifier/source 534 are to be routed to a VRS system 550.

Based on determining that voice calls associated with the device identifier/source 534 are to be routed to a VRS system 550, the single number communications controller 512 may transmit a voice communications request 540 to the VRS system 550. The voice communications request 540 may also include the source 534 and the destination 524 associated with the DHH user device 110 and the hearing user device 164, respectively. In various examples, the voice communications request 540 may be a SIP INVITE 320.

In response to this voice communications request 540, the VRS system 550 may establish a voice communications session 560 between an interpreter at the VRS system 550 (e.g., an interpreter's device), the DHH user device 110, and the hearing user device 164. As noted, such a session may be a video session or may be a video and audio data session allowing the DHH user to view the interpreter at the VRS system 550 and, in some examples the hearing user associated with the hearing user device 164.

FIG. 6 illustrates a schematic diagram 600 that may represent a subset of the functions and components represented in environment 100 of FIG. 1. In this example, a non-voice communications request (e.g., a request for communications other than an assisted voice call) may be processed. A wireless communications network 610 may include a single number communications controller 612. The single number communications controller 612 may be configured as a dedicated component and/or function in the wireless communications network 610. Alternatively, the single number communications controller 612 may be configured at an SBC, CSCF, and/or as a function and/or component of any other one or more other network components. The DHH user device 110 may be in communication with the wireless communications network 610 and, in particular, with the single number communications controller 612 (e.g., via a base station and/or one or more other network components). A VRS system 650 may also, or instead, be in communication with the wireless communications network 610 and, in particular, with the single number communications controller 612 (e.g., via a SIP trunk, a data connection (e.g., facilitating data exchange using an API at the VRS system 650), and/or one or more other network components). The hearing user device 164 may also, or instead, be in communication with the wireless communications network 610 directly or indirectly (e.g., via the VRS system 650 during an assisted call).

The wireless communications network 610 may also include a text communications controller 614 that may be configured to process and facilitate text communications between user devices. The text communications controller 614 may interact with the single number communications controller 612 directly and/or indirectly to process and facilitate such text communications.

The single number communications controller 612 may be configured with and/or have access to single number communications data 630. As with single number communications data 530, the single number communications data 630 may be one or more data structures that may be used by the single number communications controller 612 to determine single number communications operations and may be generated, stored, populated, and/or modified as described herein (e.g., as iFC data). In the illustrated example, the user of the DHH user device 110 and/or an operator of the VRS system 650 may have requested a single number communications routing configuration for the DHH user device 110 and/or the device identifier 634.

The DHH user device 110 may transmit a communications request 620 to the wireless communications network 610 where it may be received at the single number communications controller 612. The communications request 620 may be any type of communications request, including a request to establish a packet-based voice communications session. The communications request 620 may include a text communications type 622 indicating that the communications request 620 is requesting the (e.g., asynchronous) transmission of text communications. The communications request 620 may further include an indication of a source 634, which may be the device identifier 634 for the DHH user device 110. The communications request 620 may further include an indication of a destination 624, which may be a device identifier 624 for the hearing user device 164.

The single number communications controller 612 may evaluate the communications request 620 to determine the appropriate operations. In examples, the single number communications controller 612 may determine whether the request 620 is a request for voice communications and, if not, may process the request 620 based on normally applicable operations for the associated request type. In the illustrated example, the single number communications controller 612 may determine, based on the text communications type 622, that the communications request 620 is not a request for a voice call. Based on this determination, the single number communications controller 612 may not determine whether the source 634 is represented in the single number communications data 630 and may, instead, process the request 620 based on normally applicable text messaging establishment operations. In the illustrated example, the single number communications controller 612 may interact with the text communications controller 614 to transmit the text communications 640 to the hearing user device 164. In examples, the text communications 640 may indicate the source 634 and the destination 624. In this example, the VRS system 650 is not involved with the text communications 640.

FIG. 7 illustrates a schematic diagram 700 that may represent a subset of the functions and components represented in environment 100 of FIG. 1. In this example, a request to suspend assistance routing for voice calls may be processed. A wireless communications network 710 may include a single number communications controller 712. As with other number communications controllers described herein, the single number communications controller 712 may be configured as a dedicated component and/or function or at an SBC, CSCF, and/or as a function and/or component of any other one or more other network components. The DHH user device 110 may be in communication with the wireless communications network 710 and, in particular, with the single number communications controller 712 (e.g., via a base station and/or one or more other network components). A VRS system 740 may also, or instead, be in communication with the wireless communications network 710 and, in particular, with the single number communications controller 712 (e.g., via a SIP trunk, a data connection (e.g., facilitating data exchange using an API at the VRS system 740), and/or one or more other network components). The hearing user device 164 may also, or instead, be in communication with the wireless communications network 710 directly or indirectly (e.g., via the VRS system 740 during an assisted call).

The wireless communications network 710 may also include a communications controller 714 that may be configured to process and facilitate one or more types of communications between user devices. The communications controller 714 may interact with the single number communications controller 712 directly and/or indirectly to process and facilitate such communications.

The single number communications controller 712 may be configured with and/or have access to single number communications data 730. As with single number communications data 530 and 630, the single number communications data 730 may be one or more data structures that may be used by the single number communications controller 712 to determine single number communications operations and may be generated, stored, populated, and/or modified as described herein (e.g., as iFC data). In the illustrated example, the user of the DHH user device 110 and/or an operator of the VRS system 740 may have requested a single number communications routing configuration for the DHH user device 110 and/or the device identifier 734.

The DHH user device 110 may transmit an assistance suspension request 720 to the wireless communications network 710 where it may be received at the single number communications controller 712. The assistance suspension request 720 may be a request to suspend assistance routing for the device associated with the source 734 indicated in the request 720, which may be the device identifier 734 associated with the DHH user device 110. The assistance suspension request 720 may also include a suspension code 722 that may represent one or more suspension parameters. For example, the suspension code 722 may be a code that indicates that assistance system routing for the source 734 (the device identifier 734) should be suspended. In such examples, the suspension of assistance routing may be maintained until a subsequent suspension code (e.g., the same code or a different code) is received at the single number communications controller 712 requesting that assistance routing should be restored. As noted, this may allow a user to toggle assistance routing as desired. Alternatively or additionally, the suspension code 722 may be a code that indicates that assistance system routing for the source 734 should be suspended for a defined period of time. For example, the single number communications controller 712 may be configured with a predefined default period of suspension time associated with one or more suspension codes. Alternatively or additionally, the suspension code 722 may indicate the period of suspension time requested by the user (e.g., may represent a parameter indicating a period of suspension time).

In response to the assistance suspension request 720, the single number communications controller 712 may suspend assistance routing for the source 734 (represented by the shading of the entry for device identifier 734 in the single number communications data 730 illustrated in FIG. 7). This may take the form of modifying an entry in the single number communications data 730 associated with the source. In some examples, assistance routing may be suspended by disabling iFC data associated with the source 734 and/or the DHH user device 110 at a CSCF (e.g., configured at or accessible to the single number communications controller 712).

With assistance routing disabled for the source 734, a communications request 750 may be received at the single number communications controller 712 from the DHH user device 110. The communications request 750 may be any type of communications request, including a request to establish a packet-based voice communications session and a request to transmit a text message. The requested communications type may be indicated by a communications type 752 in the communications request 750. The communications request 750 may further include an indication of a source 734, which may be the device identifier 734 for the DHH user device 110. The communications request 750 may further include an indication of a destination 754, which may be a device identifier 754 for the hearing user device 164.

The single number communications controller 712 may evaluate the communications request 750 to determine the appropriate operations. In examples, the single number communications controller 712 may determine whether the request 750 is a request for voice communications and, if not, may process the request 750 based on normally applicable operations for the associated request type. In the illustrated example, the single number communications controller 712 may determine, based on the communications type 752, that the communications request 750 is a request for a voice call. Based on this determination, the single number communications controller 712 may determine whether the source 734 is represented in the single number communications data 730. Based on identifying the source 734 in the single number communications data 730, the single number communications controller 712 may determine that the entry for the source 734 has been disabled and/or that assistance routing for the source 734 is otherwise suspended. In response, the single number communications controller 712 may process the request 750 based on normally applicable voice call establishment operations.

For example, based on determining that assistance routing for the source 734 is suspended, the single number communications controller 712 may transmit the communications request 760 indicating the source 734 and the destination 754 to the communications controller 714. The communications controller 714 may perform one or more communications establishment operations 780, in examples interacting with a network and/or IMS 770 that may or may not be associated with the wireless communications network 710. The communications controller 714 and/or one or more other components may facilitate communications 790 between the DHH user device 110 and the hearing user device 164. In this example, because assistance routing was suspended for the source 734 and/or the SHH user device 110, the VRS system 740 is not involved with the communications 790, even if such communications are voice communications.

Illustrative Operations

Figure 8:
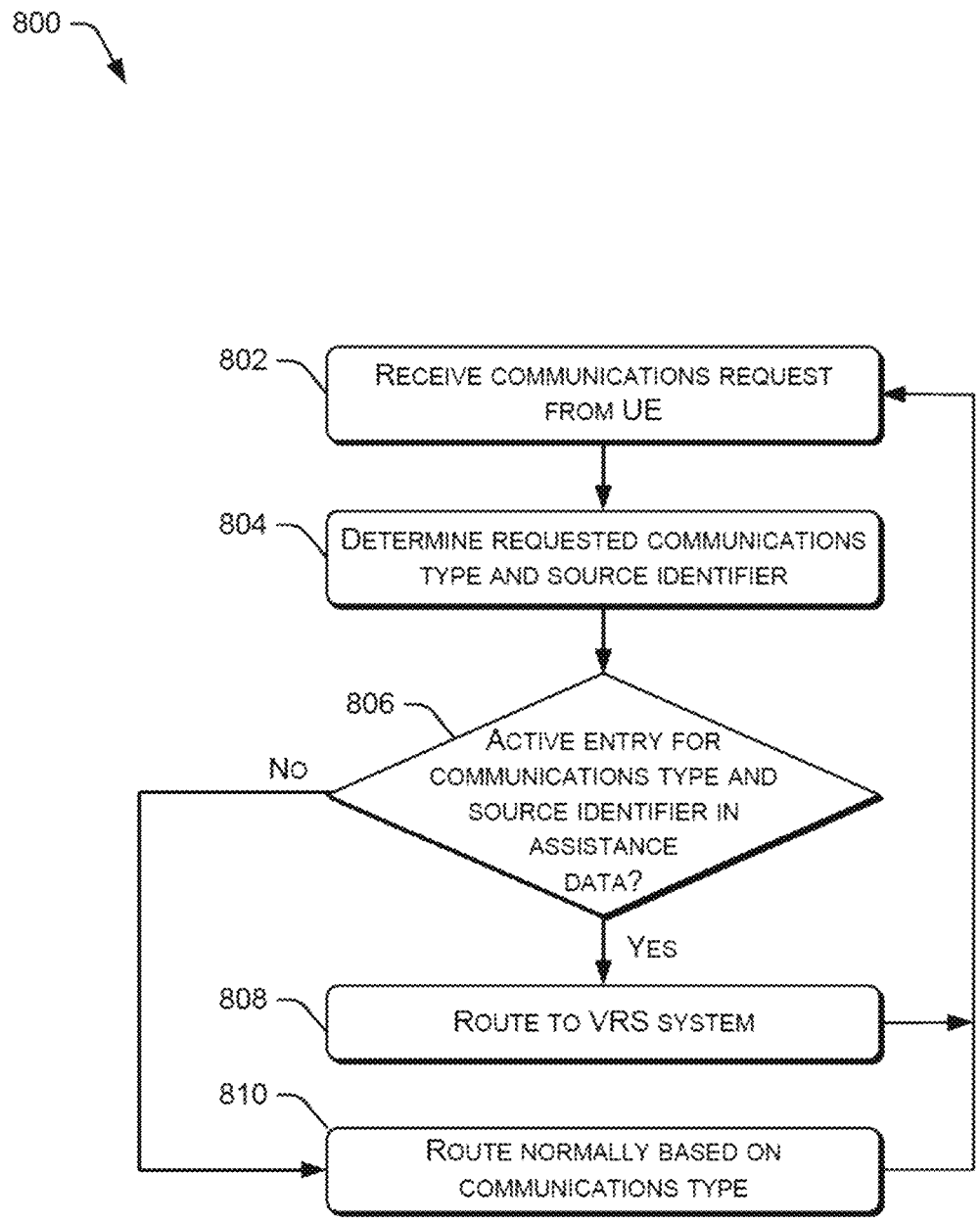
FIG. 8 is a flow diagram of an illustrative process for processing a communications request in a single number communications accessibility system, in accordance with examples of the disclosure.

FIG. 8 shows a flow diagram of an illustrative process 800 for determining assistance routing using single number communications accessibility operations according to the disclosed embodiments. The process 800 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 800 may be described with reference to the wireless network environment 100 of FIG. 1; however other environments may also be used.

At block 802, a communications request may be received from a UE at a single number communications accessibility system, for example, at a single number communications controller and/or one or more functions and/or components configured at such a system to perform single number communications accessibility operations as described herein (e.g., SBC, CSCF, etc.). The received communications request may be any type of communications request, including a request to establish a voice or a non-voice communications session. The communications request may indicate a source device (e.g., an identifier associated with a source device) and a destination device (e.g., an identifier associated with a destination device). Either or both of the source device and/or destination device may be a DHH user device.

At block 804, the system may determine the requested communications type and a source identifier based on the communications request received at block 802. Suing this information, at block 806, the system may determine whether there is an active (e.g., not suspended or disabled) entry corresponding to the communications type and source identifier in single number communications data (e.g., iFC data). In examples, the system may determine whether to access such single number communications data based on the communications type. For instance, if the communications type is not voice (e.g., one or more particular types of voice-related communications associated with assistance routing), the system may determine that access to the single number communications data is unnecessary. On the other hand, if the communications type is voice (e.g., one or more of the particular types of voice-related communications associated with assistance routing), the system may determine to access the single number communications data to evaluate such data using the source identifier and, in some example, the communications type.

If the system determines to access the single number communications data to evaluate data using the source identifier, the system may determine if data in the single number communications data indicates that the requested voice communication type, when associated with the source identifier, is to be routed to an assistance system. In examples, the system may determine whether there is an entry associated with the source identifier in the single number communications data and, if so, an associated assistance system. The associated assistance system may be indicated by the entry associated with the source identifier and/or may be determined using other means (e.g., as a default assistance system).

If, at block 806, the system determines that there is an active entry corresponding to the communications type and source identifier in the single number communications data (e.g., voice communications were requested the source identifier is represented in the single number communications data), at block 808, the system may route the communications request to a VRS system for completion of the assisted call establishment process (e.g., as described herein). The process 800 may return to block 802 to process additional communications requests.

If, at block 806, the system determines that there is no active entry corresponding to the communications type and source identifier in the single number communications data (e.g., voice communications not requested and/or source identifier not represented in the single number communications data), at block 810, the system may route the communications request normally and/or otherwise process the request using standard processing operations and/or processing operations that are not otherwise associated with assistance routing. The process 800 may return to block 802 to process additional communications requests.

Figure 9:
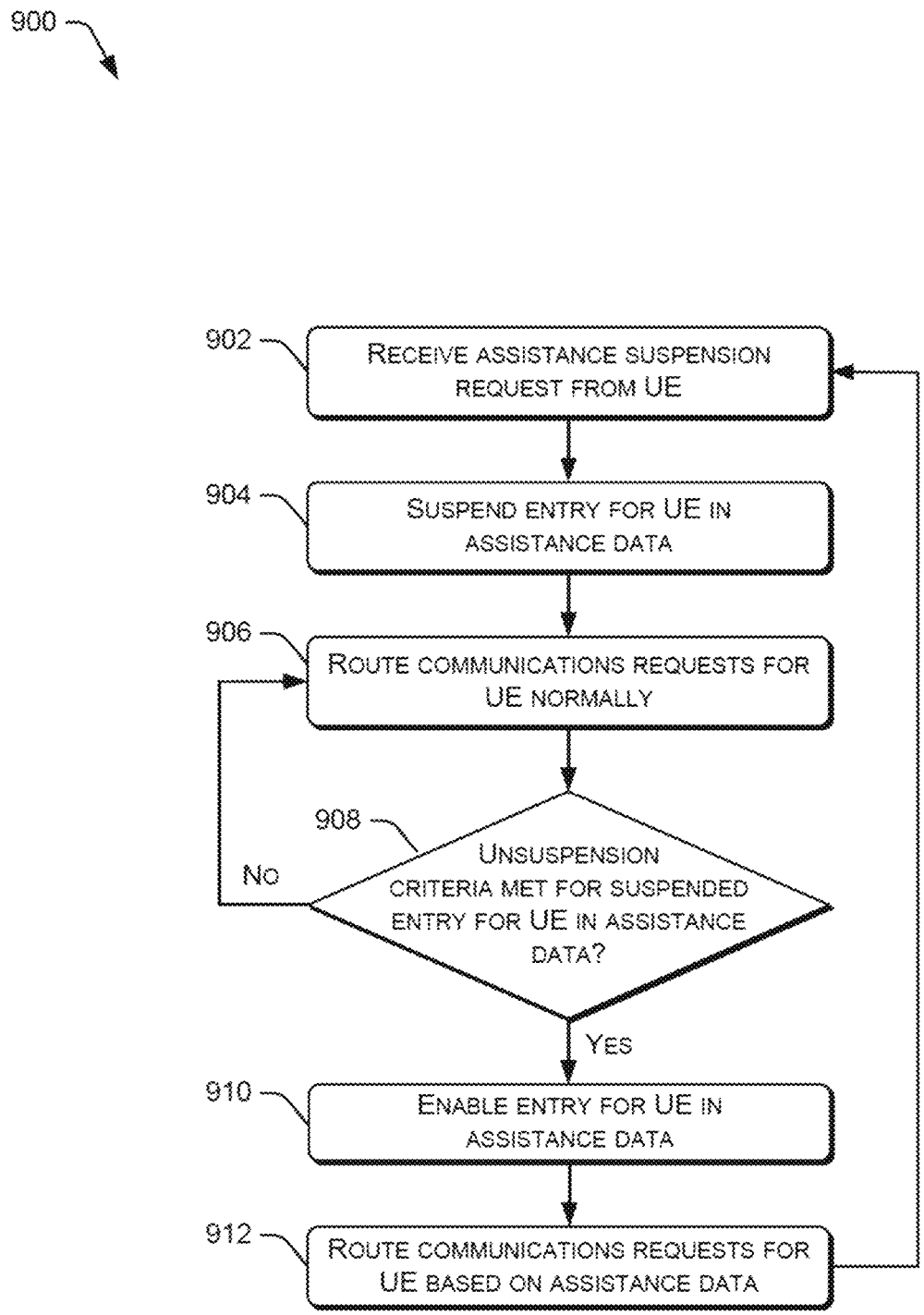
FIG. 9 is a flow diagram of an illustrative process for processing a request to suspend call assistance in a single number communications accessibility system, in accordance with examples of the disclosure.

FIG. 9 shows a flow diagram of an illustrative process 900 for suspending and restoring assistance routing using single number communications accessibility operations according to the disclosed embodiments. The process 900 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 900 may be described with reference to the wireless network environment 100 of FIG. 1; however other environments may also be used.

At block 902, an assistance suspension request may be received from a UE at a single number communications accessibility system, for example, at a single number communications controller and/or one or more functions and/or components configured at such a system to perform single number communications accessibility operations as described herein (e.g., SBC, CSCF, etc.). The assistance suspension request may indicate a particular device (e.g., an identifier associated with a device, such as a UE) that may be a DHH user device. In some examples, this device may be inferred based on the source address or number associated with the received request (e.g., where the request is a text message). The assistance suspension request may also, or instead, include a suspension code and/or one or more suspension parameters (e.g., that may be represented by the suspension code in some examples). For example, the suspension code may indicate that assistance system routing for the associated device should be suspended generally or for a period of time (e.g., that may be indicated by one or more suspension parameters and/or that may be predefined).

In response to the assistance suspension request, at block 904 the system may suspend assistance routing for the associated device, for example, by modifying an entry in single number communications data associated with the device, disabling iFC data associated with the device, etc.

At block 906, the system may route (e.g., all) communications for the device associated with the request received at 902 normally or may otherwise use standard processing operations and/or processing operations that are not associated with assistance routing.

At block 908, the system may determine if one or more unsuspension criteria associated with the suspended assistance routing data have been met. For example, where the suspension of assistance routing is associated with a period of time, the system may determine if the period of time has expired. Alternatively or additionally, the system may determine whether another suspension code "toggling" the suspension has been received that may be used to unsuspend the assistance routing for the device associated with the request received at block 902. If the unsuspension criteria for an assistance routing suspension associated with the device have not been met at block 908, the process 900 may return to block 906 to continue to route requests and communications for the device normally or otherwise using standard processing operations and/or processing operations that are not associated with assistance routing.

If the unsuspension criteria for an assistance routing suspension associated with the device have been met at block 908, the process 900 may proceed to block 910 to enable or otherwise reactivate the assistance routing data in single number communications data for the device associated with the request received at block 902 and with the unsuspension criteria. Moving to block 912, the system may now route requests for voice calls and other communications that may be associated with such assistance routing data accordingly, while routing other communications requests normally or otherwise using non-assistance routing procedures and/or operations. The process 900 may return to block 902 to process additional assistance suspension requests.

In summary, by more efficiently and conveniently implementing and/or suspending assistance routing operations without requiring the use of multiple telephone numbers, the disclosed systems and techniques may be able to increase the ease of usage of telecommunications systems for DHH user and increase the efficiency of network and user device operations, improving the user experience and performance of both the network and user devices.

Example User Equipment

Figure 10:
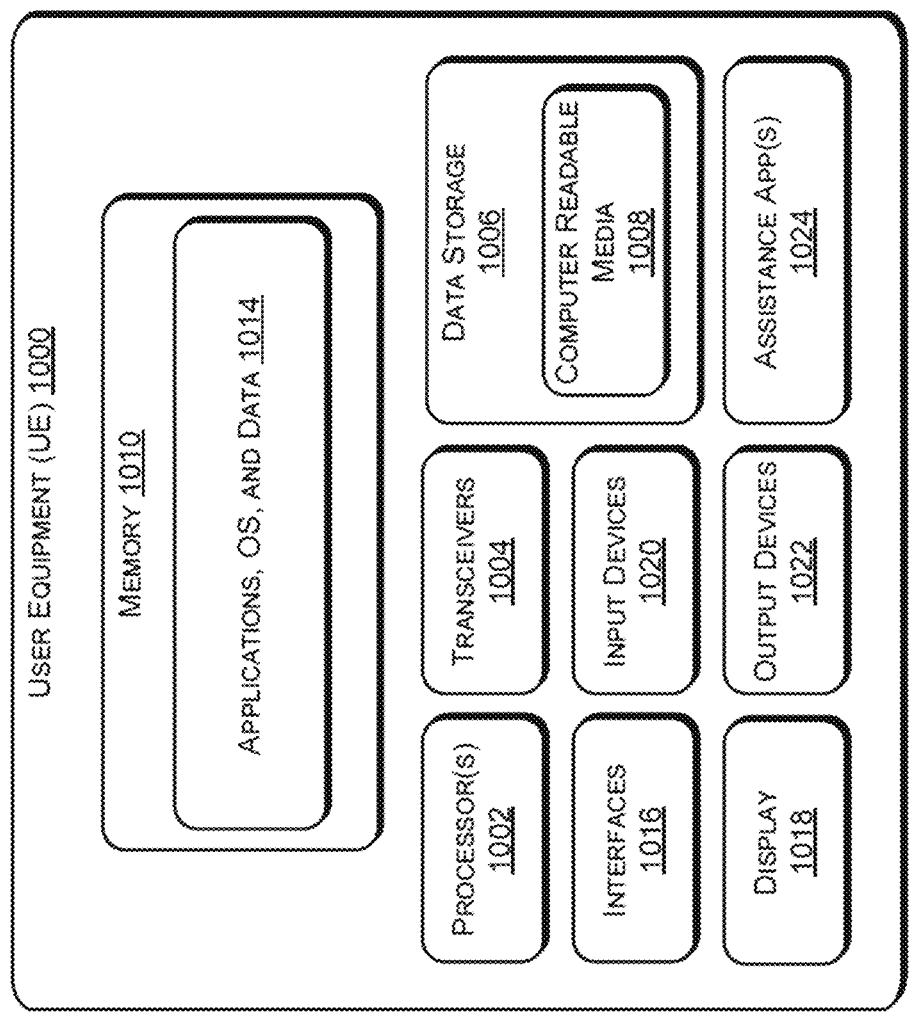
FIG. 10 is a schematic diagram of illustrative components in an example user device that may be configured for single number communications accessibility, in accordance with examples of the disclosure.

FIG. 10 illustrates exemplary UE 1000, which may be a UE such as UE 111, hearing user device 162, or hearing user device 164, for use with the systems and methods disclosed herein, in accordance with some examples of the present disclosure. The UE 1000 may include one or more processors 1002, one or more transmit/receive antennas (e.g., transceivers or transceiver antennas) 1004, and a data storage 1006. The data storage 1006 may include a computer readable media 1008 in the form of memory and/or cache. This computer-readable media may include a non-transitory computer-readable media. The processor(s) 1002 may be configured to execute instructions, which can be stored in the computer readable media 1008 and/or in other computer readable media accessible to the processor(s) 1002. In some configurations, the processor(s) 1002 is a Central Processing Unit (CPU), a Graphics Processing Unit (GPU), or both CPU and GPU, or any other sort of processing unit. The transceiver antenna(s) 1004 can exchange signals with a base station, such as base station 148.

The UE 1000 may be configured with a memory 1010. The memory 1010 may be implemented within, or separate from, the data storage 1006 and/or the computer readable media 1008. The memory 1010 may include any available physical media accessible by a computing device to implement the instructions stored thereon. For example, the memory 1010 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 1000.

The memory 1010 can store several modules, such as instructions, data stores, and so forth that are configured to execute on the processor(s) 1002. In configurations, the memory 1010 may also store one or more applications 1014 configured to receive and/or provide voice, data, and messages (e.g., SMS messages, Multi-Media Message Service (MMS) messages, Instant Messaging (IM) messages, Enhanced Message Service (EMS) messages, etc.) to and/or from another device or component (e.g., the base station 148). The applications 1014 may also include one or more operating systems and/or one or more third-party applications that provide additional functionality to the UE 1000.

Although not all illustrated in FIG. 10, the UE 1000 may also comprise various other components, e.g., a battery, a charging unit, one or more network interfaces 1016, an audio interface, a display 1018, a keypad or keyboard, and one or more input devices 1020, and one or more output devices 1022. The UE 1000 may further include one or more assistance apps 1024 that may be configured to facilitate voice communications between the UE 1000 and one or more assistance systems, such as the VRS system 120, as described herein for single number communications accessibility operations and components.

Example Computing Device

Figure 11:
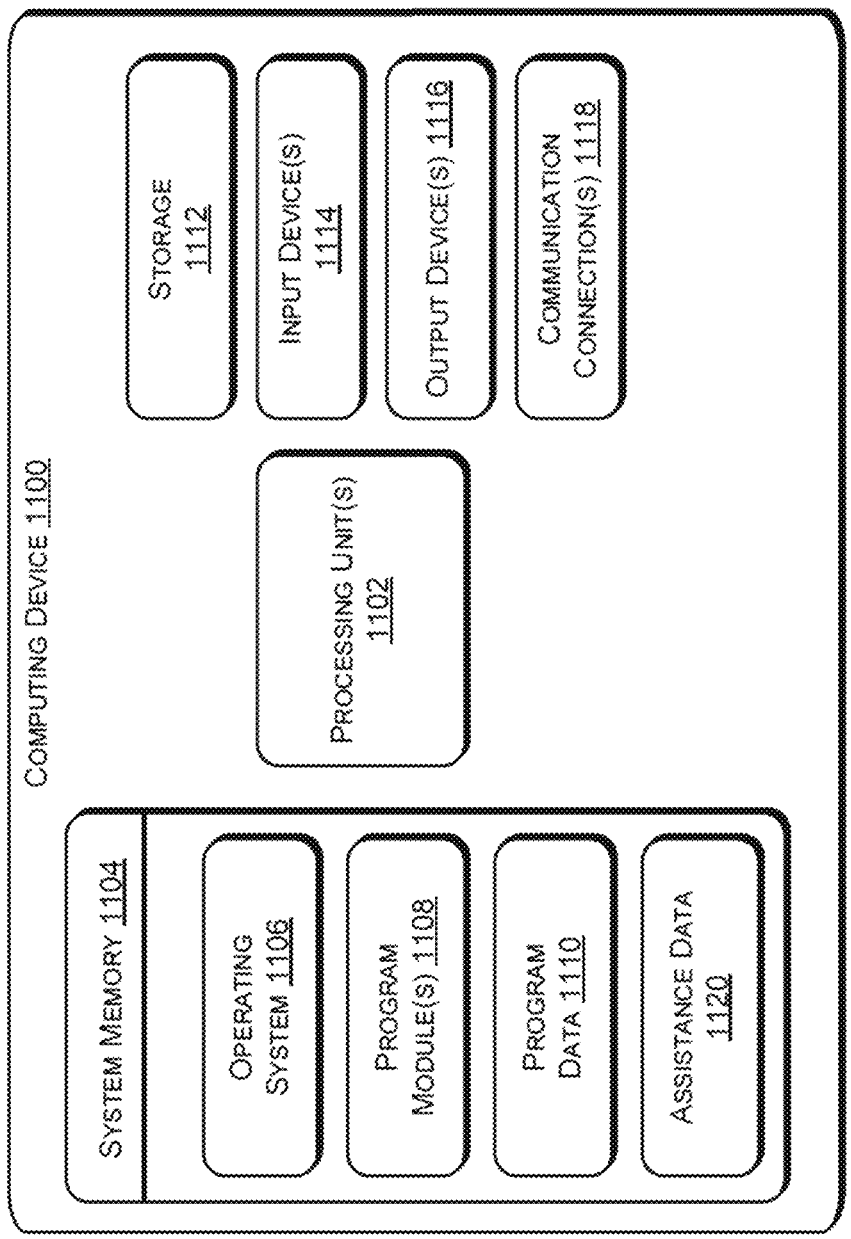
FIG. 11 is a schematic diagram of illustrative components in an example computing device that may be configured for single number communications accessibility, in accordance with examples of the disclosure.

FIG. 11 is an example of a computing device 1100 for use with the systems and methods disclosed herein, in accordance with some examples of the present disclosure. The computing device 1100 can be used to implement various components of a core network, a base station, and/or any servers, routers, gateways, gateway elements, administrative components, etc. that can be used by a communication provider. One or more computing devices 1100 can be used to implement the network 140, for example. One or more computing devices 1100 can also be used to implement base stations and other components.

In various embodiments, the computing device 1100 can include one or more processing units 1102 and system memory 1104. Depending on the exact configuration and type of computing device, the system memory 1104 can be volatile (such as RAM), non-volatile (such as ROM, flash memory, etc.) or some combination of the two. The system memory 1104 can include an operating system 1106, one or more program modules 1108, program data 1110, and one or more digital certificates 1120. The system memory 1104 may be secure storage or at least a portion of the system memory 1104 can include secure storage. The secure storage can prevent unauthorized access to data stored in the secure storage. For example, data stored in the secure storage can be encrypted or accessed via a security key and/or password.

The computing device 1100 can also include additional data storage devices (removable and/or non-removable) such as, for example, magnetic disks, optical disks, or tape. Such additional storage is illustrated in FIG. 11 by storage 1112.

Non-transitory computer storage media of the computing device 1100 can include volatile and nonvolatile, removable and non-removable media implemented in any method or technology for storage of information, such as computer readable instructions, data structures, program modules, or other data. The system memory 1104 and storage 1112 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 1100. Any such non-transitory computer readable storage media can be part of the computing device 1100.

In various embodiment, any or all of the system memory 1104 and storage 1112 can store programming instructions which, when executed, implement some or all of the functionality described above as being implemented by one or more systems configured in the environment 100 and/or components of the network 140.

The computing device 1100 can also have one or more input devices 1114 such as a keyboard, a mouse, a touch-sensitive display, voice input device, etc. The computing device 1100 can also have one or more output devices 1116 such as a display, speakers, a printer, etc. can also be included. The computing device 1100 can also contain one or more communication connections 1118 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

A: A method comprising: receiving, from a user equipment (UE) at a session border controller (SBC) configured at a wireless communications network, a request to establish a communications session between the UE and a destination device; determining, at the SBC and based at least in part on the request, a requested communications type and a device identifier associated with the UE; determining, at the SBC and based at least on the requested communications type and the device identifier, assistance routing data associated with the UE; generating, based at least in part on determining the assistance routing data associated with the UE and the request, a session initiation protocol (SIP) INVITE message based at least in part on the request; transmitting, by the SBC and based at least in part on the assistance routing data, the SIP INVITE message to a video relay service (VRS) system; and establishing, via the wireless communications network and based at least in part on the SIP INVITE message, the communications session between the UE and the destination device via the VRS system.

B: The method of paragraph A, wherein the SBC is associated with a call session control function (CSCF) configured to determine the assistance routing data associated with the UE.

C: The method of paragraph A or B, wherein determining the assistance routing data associated with the UE is further based at least in part on initial filter criteria (iFC) data.

D: The method of any of paragraphs A-C, wherein transmitting the SIP INVITE message to the VRS system comprises transmitting the SIP INVITE message via a SIP trunk communicatively connecting the SBC and the VRS system.

E: The method of any of paragraphs A-D, wherein the assistance routing data comprises an indication of the VRS system.

F: The method of any of paragraphs A-E, further comprising accessing, by a call session control function (CSCF) associated with the SBC, the assistance routing data from a home subscriber server (HSS).

G: A session border controller (SBC) comprising: one or more processors; one or more transceivers; and non-transitory computer-readable media storing computer-executable instructions that, when executed by the one or more processors, cause the one or more processors to perform operations comprising: receiving, from a user equipment (UE), a first request to establish a communications session between the UE and a destination device; determining, based at least in part on the first request, a requested communications type and a device identifier associated with the destination device; determining, based at least on the requested communications type and the device identifier, assistance routing data associated with the destination device; transmitting, based at least in part on the first request and the assistance routing data, a second request to establish the communications session to a video relay service (VRS) system; and establishing, based at least in part on the second request, the communications session between the UE and the destination device via the VRS system.

H: The SBC of paragraph G, wherein the operations further comprise: receiving, from the destination device, a third request to suspend use of the assistance routing data; and disabling, based at least on the third request, the assistance routing data.

I: The SBC of paragraph H, wherein the operations further comprise: receiving, from the destination device, a fourth request to resume use of the assistance routing data; and restoring, based at least on the fourth request, the assistance routing data.

J: The SBC of paragraph H or I, wherein the operations further comprise: determining that a time period has elapsed since disabling the assistance routing data; and restoring, based at least on determining that the time period has elapsed, the assistance routing data.

K: The SBC of paragraph J, wherein the third request comprises an indication of the time period.

L: The SBC of any of paragraphs G-K, wherein determining, based at least on the requested communications type and the device identifier, the assistance routing data comprises determining that the communications type is associated with voice communications.

M: The SBC of any of paragraphs G-L, wherein the assistance routing data comprises initial filter criteria (iFC) data.

N: The SBC of any of paragraphs G-M, wherein the device identifier is one of: a telephone number; a mobile station international subscriber directory number (MSISDN); an international mobile subscriber identity (IMSI); or a network address.

O: A non-transitory computer-readable media storing computer-executable instructions that, when executed by one or more processors, cause the one or more processors to perform operations comprising: receiving, from a user equipment (UE) at a session border controller (SBC) configured at a wireless communications network, a first request to establish a communications session between the UE and a destination device; determining, at the SBC and based at least in part on the first request, a requested communications type and a device identifier associated with the UE; determining, at the SBC and based at least on the requested communications type and the device identifier, assistance routing data associated with the UE; transmitting, by the SBC and based at least in part on the first request and the assistance routing data, a second request to establish the communications session to a video relay service (VRS) system; and establishing, via the wireless communications network and based at least in part on the second request, the communications session between the UE and the destination device via the VRS system.

P: The non-transitory computer-readable media of paragraph O, wherein the operations further comprise: receiving, from a user equipment (UE) at a session border controller (SBC) configured at a wireless communications network, a third request to transmit data from the UE to the destination device; determining, at the SBC and based at least in part on the third request, a communications type associated with the third request and the device identifier associated with the UE; and determining, at the SBC and based at least on the communications type associated with the third request and the device identifier, to route the third request based at least in part on the third request and excluding the assistance routing data.

Q: The non-transitory computer-readable media of paragraph O or P, wherein the requested communications type is a video call.

R: The non-transitory computer-readable media of any of paragraphs O-Q, wherein transmitting the second request to the VRS system causes the VRS system to: generate a session initiation protocol (SIP) INVITE message based at least in part on the second request; and transmit the SIP INVITE message to the destination device.

S: The non-transitory computer-readable media of paragraph R, wherein the SIP INVITE message comprises a source identifier comprising the device identifier associated with the UE and a destination identifier comprising a second device identifier associated with the destination device.

T: The non-transitory computer-readable media of any of paragraphs O-S, wherein the assistance routing data comprises initial filter criteria (iFC) data.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   receiving, from a user equipment (UE) at a session border controller (SBC) configured at a wireless communications network, a request to establish a communications session between the UE and a destination device;
   determining, at the SBC and based at least in part on the request, a requested communications type and a device identifier associated with the UE;
   determining, at the SBC and based at least on the requested communications type and the device identifier, assistance routing data associated with the UE;
   generating, based at least in part on determining the assistance routing data associated with the UE and the request, a session initiation protocol (SIP) INVITE message based at least in part on the request;
   transmitting, by the SBC and based at least in part on the assistance routing data, the SIP INVITE message to a video relay service (VRS) system; and
   establishing, via the wireless communications network and based at least in part on the SIP INVITE message, the communications session between the UE and the destination device via the VRS system.

2. The method of claim 1, wherein the SBC is associated with a call session control function (CSCF) configured to determine the assistance routing data associated with the UE.

3. The method of claim 1, wherein determining the assistance routing data associated with the UE is further based at least in part on initial filter criteria (iFC) data.

4. The method of claim 1, wherein transmitting the SIP INVITE message to the VRS system comprises transmitting the SIP INVITE message via a SIP trunk communicatively connecting the SBC and the VRS system.

5. The method of claim 1, wherein the assistance routing data comprises an indication of the VRS system.

6. The method of claim 1, further comprising accessing, by a call session control function (CSCF) associated with the SBC, the assistance routing data from a home subscriber server (HSS).

7. A session border controller (SBC) comprising:
   one or more processors;
   one or more transceivers; and
   non-transitory computer-readable media storing computer-executable instructions that, when executed by the one or more processors, cause the one or more processors to perform operations comprising:
      receiving, from a user equipment (UE), a first request to establish a communications session between the UE and a destination device;
      determining, based at least in part on the first request, a requested communications type and a device identifier associated with the destination device;
      determining, based at least on the requested communications type and the device identifier, assistance routing data associated with the destination device;
      transmitting, based at least in part on the first request and the assistance routing data, a second request to establish the communications session to a video relay service (VRS) system; and
      establishing, based at least in part on the second request, the communications session between the UE and the destination device via the VRS system.

8. The SBC of claim 7, wherein the operations further comprise:
   receiving, from the destination device, a third request to suspend use of the assistance routing data; and
   disabling, based at least on the third request, the assistance routing data.

9. The SBC of claim 8, wherein the operations further comprise:
   receiving, from the destination device, a fourth request to resume use of the assistance routing data; and
   restoring, based at least on the fourth request, the assistance routing data.

10. The SBC of claim 8, wherein the operations further comprise:
    determining that a time period has elapsed since disabling the assistance routing data; and
    restoring, based at least on determining that the time period has elapsed, the assistance routing data.

11. The SBC of claim 10, wherein the third request comprises an indication of the time period.

12. The SBC of claim 7, wherein determining, based at least on the requested communications type and the device identifier, the assistance routing data comprises determining that the communications type is associated with voice communications.

13. The SBC of claim 7, wherein the assistance routing data comprises initial filter criteria (iFC) data.

14. The SBC of claim 7, wherein the device identifier is one of:
    a telephone number;
    a mobile station international subscriber directory number (MSISDN);
    an international mobile subscriber identity (IMSI); or
    a network address.

15. A non-transitory computer-readable media storing computer-executable instructions that, when executed by one or more processors, cause the one or more processors to perform operations comprising:
    receiving, from a user equipment (UE) at a session border controller (SBC) configured at a wireless communications network, a first request to establish a communications session between the UE and a destination device;
    determining, at the SBC and based at least in part on the first request, a requested communications type and a device identifier associated with the UE;
    determining, at the SBC and based at least on the requested communications type and the device identifier, assistance routing data associated with the UE;
    transmitting, by the SBC and based at least in part on the first request and the assistance routing data, a second request to establish the communications session to a video relay service (VRS) system; and
    establishing, via the wireless communications network and based at least in part on the second request, the communications session between the UE and the destination device via the VRS system.

16. The non-transitory computer-readable media of claim 15, wherein the operations further comprise:
  receiving, from a user equipment (UE) at a session border controller (SBC) configured at a wireless communications network, a third request to transmit data from the UE to the destination device;
  determining, at the SBC and based at least in part on the third request, a communications type associated with the third request and the device identifier associated with the UE; and
  determining, at the SBC and based at least on the communications type associated with the third request and the device identifier, to route the third request based at least in part on the third request and excluding the assistance routing data.

17. The non-transitory computer-readable media of claim 15, wherein the requested communications type is a video call.

18. The non-transitory computer-readable media of claim 15, wherein transmitting the second request to the VRS system causes the VRS system to:
  generate a session initiation protocol (SIP) INVITE message based at least in part on the second request; and
  transmit the SIP INVITE message to the destination device.

19. The non-transitory computer-readable media of claim 18, wherein the SIP INVITE message comprises a source identifier comprising the device identifier associated with the UE and a destination identifier comprising a second device identifier associated with the destination device.

20. The non-transitory computer-readable media of claim 15, wherein the assistance routing data comprises initial filter criteria (iFC) data.

* * * * *